(12) United States Patent
Wang et al.

(10) Patent No.: US 10,897,728 B2
(45) Date of Patent: Jan. 19, 2021

(54) MOBILITY MANAGEMENT FOR NEXT GENERATION MOBILE NETWORK

(71) Applicant: IDAC HOLDINGS, INC., Wilmington, DE (US)

(72) Inventors: Guanzhou Wang, Brossard (CA); Mahmoud Watfa, Saint Leonard (CA); Saad Ahmad, Montreal (CA); Ulises Olvera-Hernandez, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 53 days.

(21) Appl. No.: 16/070,092

(22) PCT Filed: Jan. 13, 2017

(86) PCT No.: PCT/US2017/013514
§ 371 (c)(1),
(2) Date: Jul. 13, 2018

(87) PCT Pub. No.: WO2017/124003
PCT Pub. Date: Jul. 20, 2017

(65) Prior Publication Data
US 2019/0028943 A1    Jan. 24, 2019

Related U.S. Application Data

(60) Provisional application No. 62/279,509, filed on Jan. 15, 2016.

(51) Int. Cl.
*H04W 52/00*    (2009.01)
*H04W 36/00*    (2009.01)
*H04W 8/06*    (2009.01)

(52) U.S. Cl.
CPC ....... *H04W 36/0083* (2013.01); *H04W 8/065* (2013.01)

(58) Field of Classification Search
CPC .................. H04W 36/0083; H04W 8/065
(Continued)

(56) References Cited

U.S. PATENT DOCUMENTS 9,485,701 B2    11/2016  Wang et al.
2007/0248054 A1   10/2007  Chen et al.
(Continued)

FOREIGN PATENT DOCUMENTS

CN    101483585 A    7/2009
CN    103987015 A    8/2014
(Continued)

OTHER PUBLICATIONS

NPL search. (Year: 2019).*
(Continued)

*Primary Examiner* — Sai Ming Chan
(74) *Attorney, Agent, or Firm* — Julian F. Santos

(57) ABSTRACT

A network may implement a method to support a mobility of a wireless transmit/receive unit (WTRU). The network or network functions may identify the WTRU that is associated with one or more capabilities and one or more mobility properties. The network or network functions may determine subscription information and network policy information for the WTRU. The network or network functions may select a mobility pattern for the WTRU based on the one or more capabilities and the one or more mobility properties associated with the WTRU, the subscription information, and the network policy information. The mobility pattern may be associated with a mobility parameter and a value corresponding to the mobility parameter.

20 Claims, 11 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2013/0229987 | A1 | 9/2013 | Turanyi et al. |
| 2013/0303114 | A1* | 11/2013 | Ahmad ................ H04M 15/49 455/406 |
| 2014/0113628 | A1* | 4/2014 | Sundararajan .......... H04L 12/66 455/435.2 |
| 2014/0378133 | A1* | 12/2014 | Kim ................ H04W 36/0016 455/436 |
| 2015/0063166 | A1* | 3/2015 | Sif ...................... G06F 9/45558 370/254 |
| 2016/0353465 | A1* | 12/2016 | Vrzic ................ H04W 28/0247 |
| 2018/0227221 | A1* | 8/2018 | Starsinic ............... H04L 45/566 |
| 2018/0352501 | A1* | 12/2018 | Zhang ................... H04W 48/14 |

FOREIGN PATENT DOCUMENTS

| | | |
|---|---|---|
| EP | 2326130 A1 | 5/2011 |
| WO | WO 2008/089704 A1 | 7/2008 |
| WO | WO 2014/112836 A1 | 7/2014 |

OTHER PUBLICATIONS

3rd Generation Partnership Project (3GPP), SP-150853, "Study on Architecture for Next Generation System", 3GPP TSG SA Meeting #70, Sitges, Spain, Dec. 9-11, 2015, pp. 1-6.

3rd Generation Partnership Project (3GPP), TR 22.891 V1.1.0, "Technical Specification Group Services and System Aspects, Feasibility Study on New Services and Markets Technology Enablers, Stage 1 (Release 14)", Nov. 2015, 95 pages.

3rd Generation Partnership Project (3GPP), TS 23.401 V13.5.0, "Technical Specification Group Services and System Aspects, General Packet Radio Service (GPRS) Enhancements for Evolved Universal Terrestrial Radio Access Network (E-UTRAN) Access (Release 13)", Dec. 2015, 337 pages.

3rd Generation Partnership Project (3GPP), TS 23.402 V13.4.0, "Technical Specification Group Services and System Aspects, Architecture Enhancements for Non-3GPP Accesses (Release 13)", Dec. 2015, 298 pages.

EISL et al., "Management of Multiple Mobility Protocols and Tools in Dynamically Configurable Networks", First Ambient Networks Workshop on Mobility, Multiaccess, and Network Management, 2007, pp. 73-78.

Hattachi et al., "NGMN 5G White Paper", Version 1.0, Feb. 17, 2015, 125 pages.

Liu et al., "Distributed Mobility Management: Current Practices and Gap Analysis", Internet Engineering Task Force (IETF), Request for Comments: 7429, Category: Informational, Jan. 2015, pp. 1-34.

Salkintzis et al., "Voice Call Handover Mechanisms in Next-Generation 3GPP Systems", IEEE Communications Magazine, vol. 47, No. 2, Available at: http://ieeexplore.ieee.org/document/4785380/ , Feb. 2009, pp. 46-56.

* cited by examiner

MOBILITY MANAGEMENT FOR NEXT GENERATION MOBILE NETWORK

CROSS-REFERENCE TO RELATED APPLICATION

This application is the National Stage entry under 35 U.S.C. § 371 of Patent Cooperation Treaty Application PCT/US2017/013514, filed Jan. 13, 2017, which claims the benefit of U.S. Provisional Patent Application No. 62/279,509, filed Jan. 15, 2016, the contents of which are hereby incorporated by reference herein.

BACKGROUND

Mobile communications may be in continuous evolution, for example we are at the doorstep of its fifth incarnation (e.g., 5G). As with previous generations, new use cases and design goals may drive many new requirements for the system. The requirements may include advanced mobility management. Mobility protocols may include gateway tunnel protocol (GTP), mobile internet protocol (MIP), proxy mobile IPv6 PMIP, and many variants based on the protocols. The future network may support a variety of parallel mobility protocols to suit diversified access network and device types.

SUMMARY

A network may implement a method to support a mobility of a wireless transmit/receive unit (WTRU). The network or network functions may identify the WTRU that is associated with one or more capabilities and one or more mobility properties. The network or network functions may determine subscription information and network policy information for the WTRU. The network or network functions may select a mobility pattern for the WTRU based on the one or more capabilities and the one or more mobility properties associated with the WTRU, the subscription information, and the network policy information. The mobility pattern may be associated with a mobility parameter and a value corresponding to the mobility parameter. The network or network functions may determine the mobility parameter and the value corresponding to the mobility parameter based on the mobility pattern. The network or network functions may configure the WTRU based on the mobility parameter and the value corresponding to the mobility parameter. The mobility parameter may define an allowed area where the WTRU may be configured to receive mobility support and/or a non-allowed area where the WTRU may not be configured to receive mobility support. The mobility parameter may define an allowed area where the WTRU may be configured to receive mobility support without performing a mobility update procedure. The subscription information may indicate whether the WTRU is subscribed for mobile originating connectivity services, mobile terminating connectivity services, location-based services, or roaming services. The network policy information may indicate an allowed geographical area for the WTRU, speed restrictions for the WTRU, access time restrictions for the WTRU, or allowed connectivity modes for the WTRU.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

A network may implement a method to support a mobility of a wireless transmit/receive unit (WTRU). The network or network functions may identify the WTRU that is associated with one or more capabilities and one or more mobility properties. The network or network functions may determine subscription information and network policy information for the WTRU. The network or network functions may select a mobility pattern for the WTRU based on the one or more capabilities and the one or more mobility properties associated with the WTRU, the subscription information, and the network policy information. The mobility pattern may be associated with a mobility parameter and a value corresponding to the mobility parameter. The network or network functions may determine the mobility parameter and the value corresponding to the mobility parameter based on the mobility pattern. The network or network functions may configure the WTRU based on the mobility parameter and the value corresponding to the mobility parameter. The mobility parameter may define an allowed area where the WTRU may be configured to receive mobility support and/or a non-allowed area where the WTRU may not be configured to receive mobility support. The mobility parameter may define an allowed area where the WTRU may be configured to receive mobility support without performing a mobility update procedure. The subscription information may indicate whether the WTRU is subscribed for mobile originating connectivity services, mobile terminating connectivity services, location-based services, or roaming services. The network policy information may indicate an allowed geographical area for the WTRU, speed restrictions for the WTRU, access time restrictions for the WTRU, or allowed connectivity modes for the WTRU.

Figure 1A:
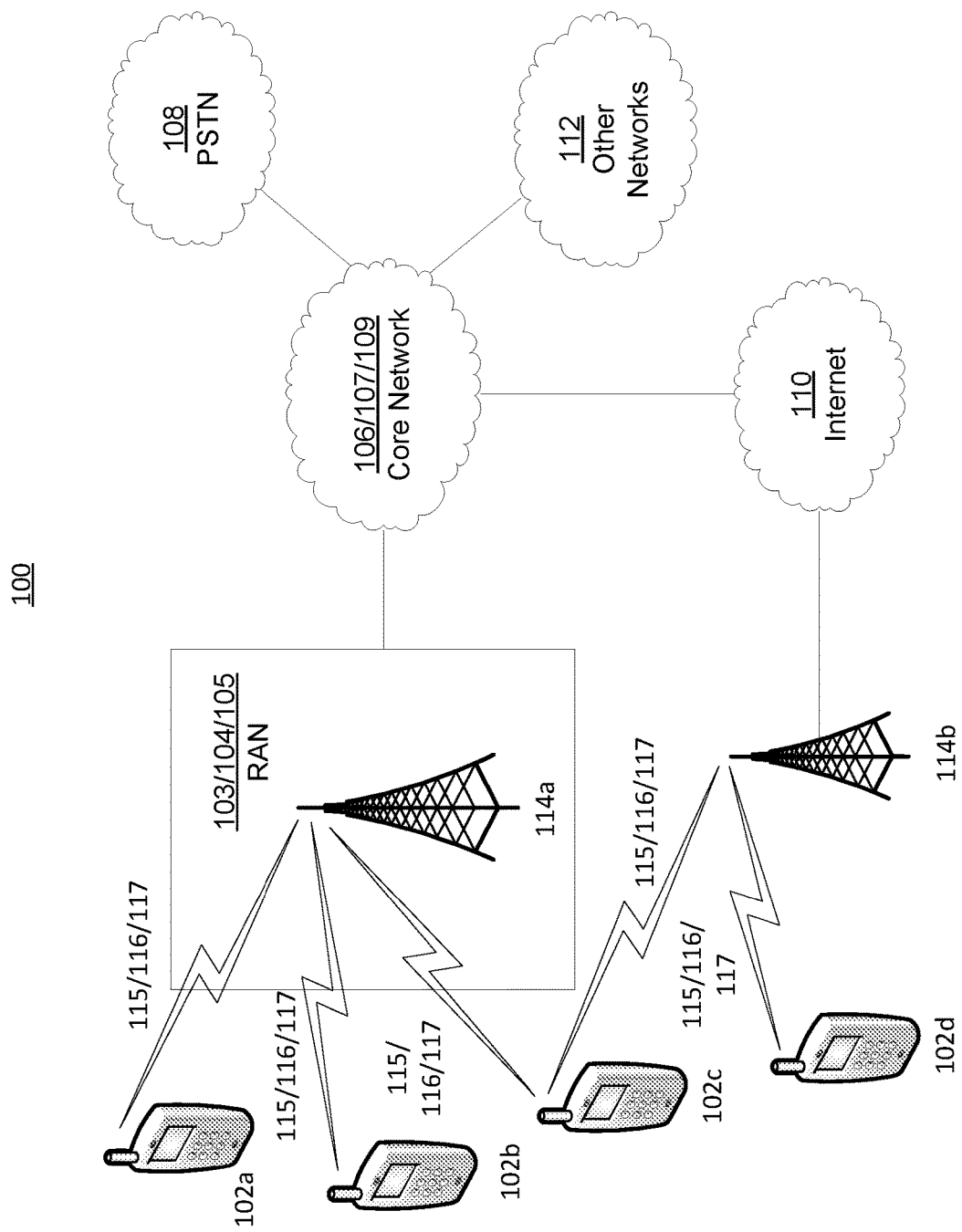
FIG. 1A is a system diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and/or the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and/or the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1a may be configured to communicate with the base station 114a, which may employ a cellular-based radio technology, and with the base station 114b, which may employ an IEEE 802 radio technology.

Figure 1B:
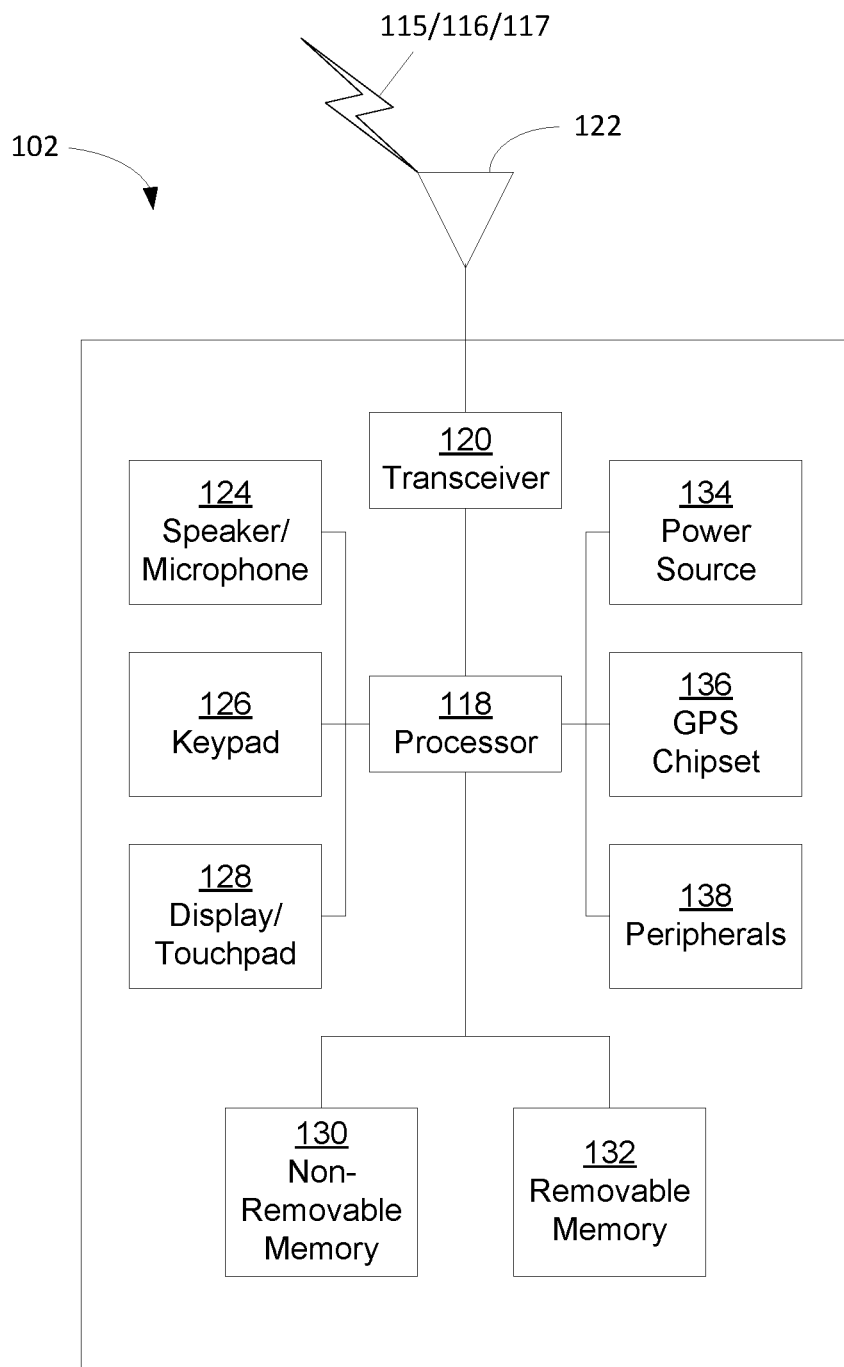
FIG. 1B is a system diagram of an example wireless transmit/receive unit (WTRU) that may be used within the communications system Illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
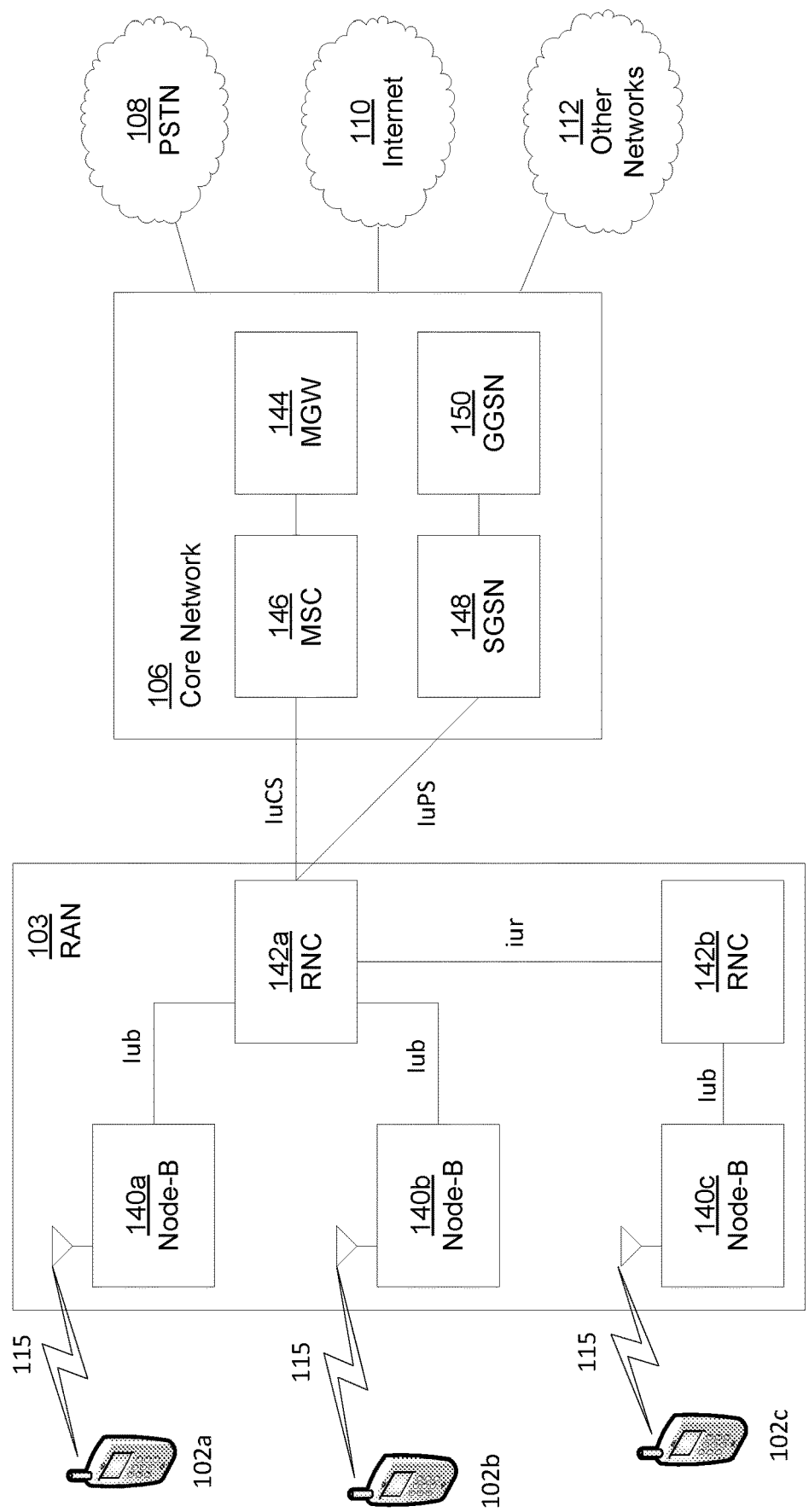
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and/or the like.

The core network 106 shown in FIG. 1C may include a media gateway (MGW) 144, a mobile switching center (MSC) 146, a serving general packet radio service (GPRS) support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
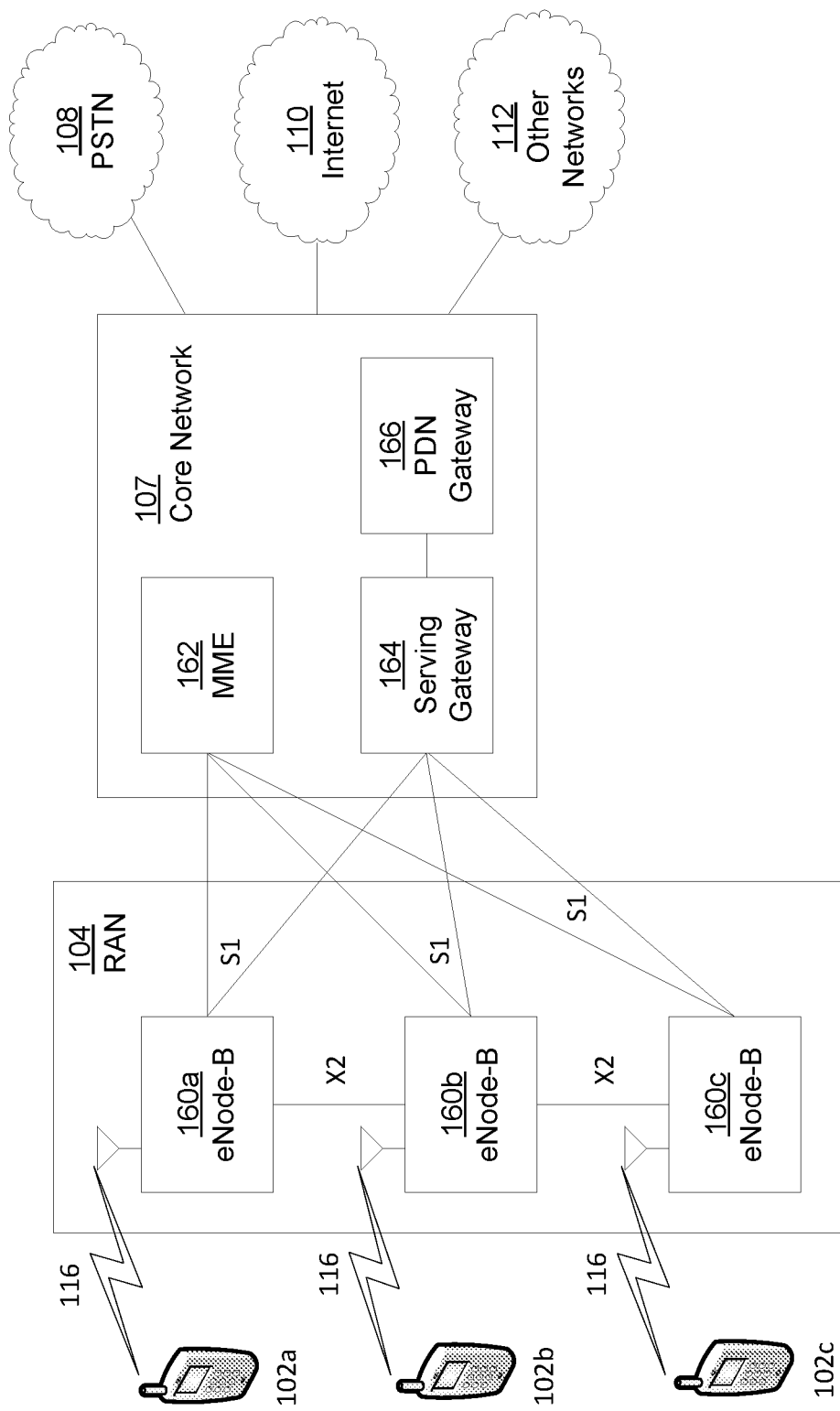
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and/or the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
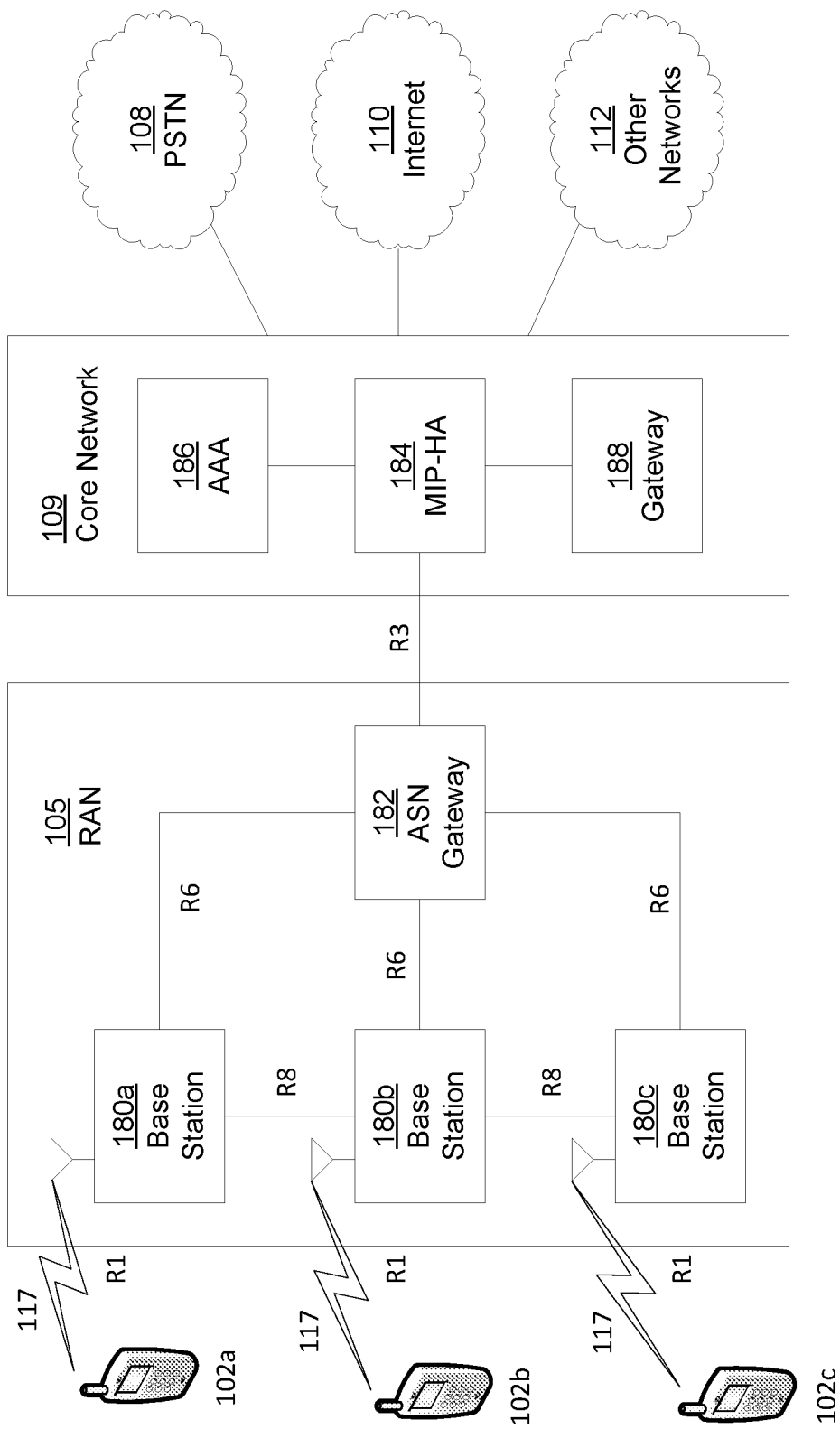
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and/or the like. The ASN gateway 182 may serve as a traffic aggregation point and may be responsible for paging, caching of subscriber profiles, routing to the core network 109, and/or the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
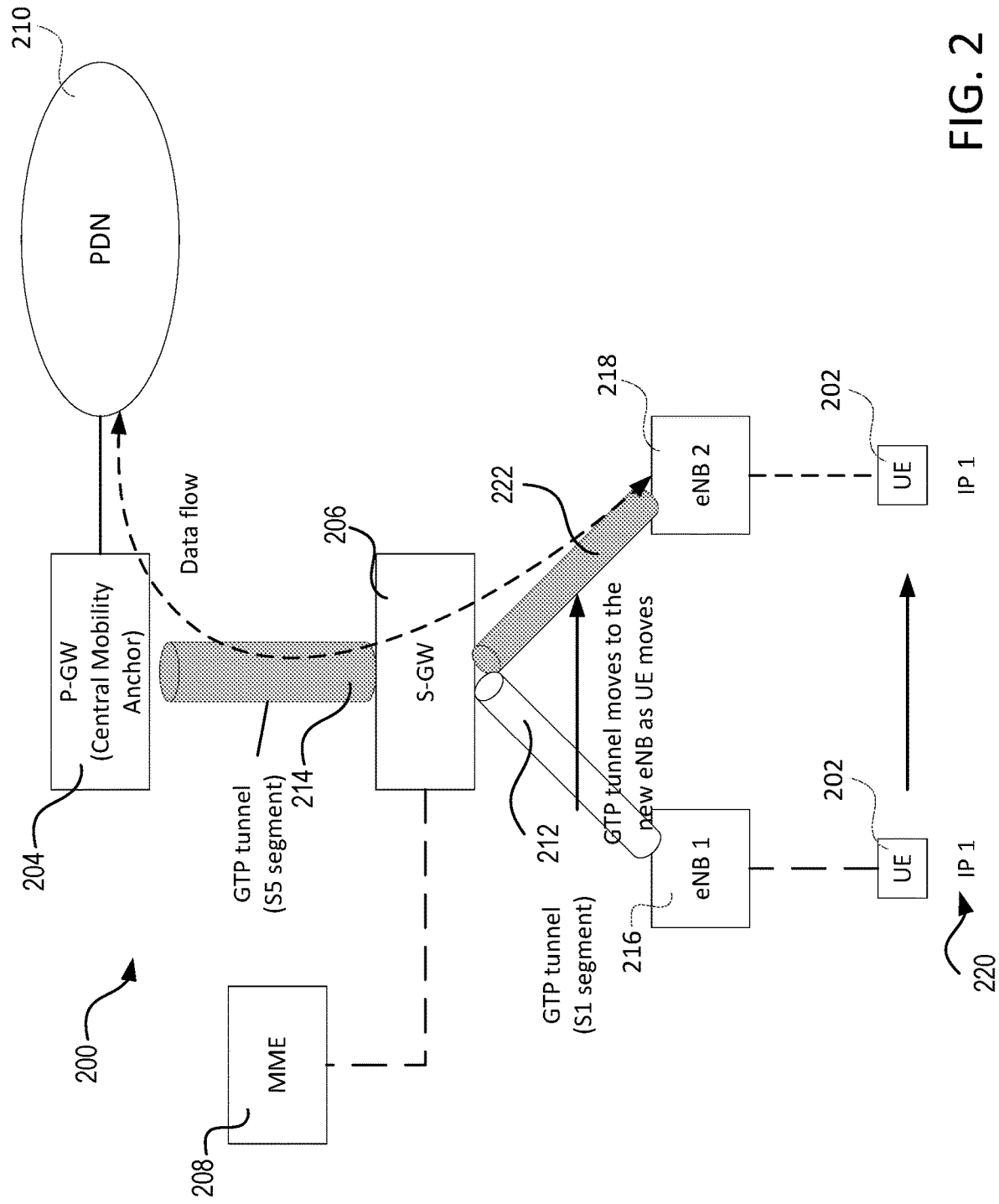
FIG. 2 illustrates an example of GTP-based mobility support in LTE EPC.

Mobility management may be used in evolved packet network (EPC). The mobility management framework of EPC may be designed around "always-on" principle. The mobility management framework of EPC may be built on the network-controlled mobility protocol gateway tunnel protocol (GTP). FIG. 2 illustrates an example of GTP-based mobility support in LTE EPC 200. As shown in FIG. 2, a wireless transmit receive unit (WTRU) 202 may be attached to a mobility anchor. The mobility anchor may be a centralized network entity (e.g., public data network (PDN) gateway 204 for the PDN 210). The WTRU 202 may remain attached to a point (e.g., a point with and/or through the P-GW 204) when the WTRU 202 moves throughout the network. The mobility anchor (e.g., the P-GW gateway 204 for the PDN 210) may allocate an internet protocol (IP) 1 context/address 220 to the WTRU 204. The IP context 220 may be used as a WTRU 204 identifier and/or an address locator. General packet radio service tunneling protocol (GTP) tunnels comprising multiple segments (e.g., S1 segment 212 and S5 segment 214) may be established between the mobility anchor 204 and the WTRU's 202 current serving access network (e.g., 216 eNB 1). The S1 segment 212 may be the segment of the GTP tunnels between 216 eNB 1 and the serving gateway (S-GW) 206. The S5 segment 214 may be between the P-GW 204 and the S-GW 206.

When WTRU 202 moves in a network (e.g., 218 eNB 2), the WTRU 202 may trigger serving access network changes. For example, the serving access network changes may be an inter-evolved NodeB (eNB) in-session handover or a tracking area update. The tracking area update may involve serving gateway (S-GW) 206 reallocation. The S-GW 206 may comprise and/or be connected with a MME 208. When WTRU 202 moves in the network, the network may manage/ move the WTRU's GTP tunnels (e.g., S1 segment from 212 to 222) to follow the WTRU's current location in a network (e.g., 218 eNB 2). Incoming data (e.g., from PDN 210 to the WTRU 202 and/or from the WTRU 202 to the PDN 210) may find the WTRU when the data follows the established GTP tunnels (e.g., S1 segment 222 and S5 segment 214). The WTRU's IP 1 context 220 may remain unchanged when moving across access networks. Tunnel management may be transparent to the WTRU 202.

Networks may support a mobility protocol and/or a variety of mobility protocols and variants based on the protocols to suit a diversified access network(s) and diversified device types. The mobility protocols may include GTP, MIP, and/or proxy MIP (PMIP). GTP was developed by 3GPP and may have been mostly used in 3GPP networks. PMIP may be developed by internet engineering task force (IETF) although it may be used in 3GPP networks. For example the EPC S5 interface may support PMIP. A system architecture that supports non-3GPP access (e.g., WiFi) may use dual stack mobile IP (DSMIP) for S2c interface.

The devices may have different mobility characteristics. For example, some devices may move at a high speed and some devices may be stationary (e.g., the mobility characteristics of the devices may change over time). A given device may have various applications. The various applications may have different mobility support. The network may or may not assume mobility support for all devices and services. The network may provide mobility on demand. For example, the mobility on demand may be provided to some devices and services while other mobility processes may be provided to other devices.

IP address preservation may or may not be mandatory for service continuity. IP mobility anchors may be positioned close to a network edge. Change of IP mobility anchors may be supported. Some distributed mobility management principles may be adopted.

Some or all use cases may have effects on techniques for performing mobility management. The use cases may or may not be directly linked to mobility management. A network may support complex and hybrid ecosystems. The ecosystems may comprise diversified devices and different access technologies. The network may be flexible. For example, the network may be flexible enough to use different mobility management mechanisms to address different requirements and to achieve consistent quality of experience for users.

Software defined network (SDN) and network virtualization may be performed and/or utilized in networks. A SDN may be an approach to computer networking. The computer networking may allow network administrators to manage network services through abstraction of higher-level functionality. A system may be decoupled that makes decisions about where traffic is sent (e.g., the traffic may be sent to a control plane) from underlying systems. The underlying systems may forward the traffic to a selected destination (e.g., the destination may be a data plane).

The SDN may allow the creation of an architecture. The SDN architecture may be dynamic, manageable, cost-effective, adaptable, and suitable for the high-bandwidth, dynamic nature of applications. The SDN architecture may decouple network control. The SDN architecture may forward functions. The SDN architecture may enable network control to become programmable. The SDN architecture may enable an underlying infrastructure to be abstracted from applications and network services. The SDN architecture may comprise one or more of the following features: directly programmable, agile, centrally managed, programmatically configured, and open standards-based and vendor-neutral. The SDN architecture may be directly programmable. The network control in the SDN architecture may be directly programmable. The network control in the SDN architecture may be directly programmable when the network control is decoupled from forwarding functions. The SDN architecture may be agile. Abstracting control from forwarding may allow administrators to dynamically adjust network-wide traffic flow and to meet changing traffic patterns/requests. The SDN architecture may be centrally managed. Network intelligence may be centralized (e.g., may be logically centralized) in software-based SDN controllers. The software-based SDN controllers may maintain a global view of the network. The centralized network intelligence may appear to applications and policy engines as a logical switch. The SDN architecture may be programmatically configured. The SDN may allow network managers to configure, manage, secure, and optimize network resources efficiently. For example, the SDN may allow network managers to configure, manage, secure, and optimize network resources efficiently via dynamic, automated SDN programs. The SDN may allow network managers to write the dynamic, automated SDN programs. The programs may or may not depend on proprietary software. The SDN architecture may be open standards-based and vendor-neutral. The SDN may simplify network design and operation (e.g., when implemented through open standards). SDN controllers or multiple, vendor-specific devices and protocols may provide instructions.

Network-function virtualization (NFV) may be a network architecture. The network architecture concept may use technologies of IT virtualization. The technologies may allow the virtualization of various network node functions as building blocks. The building blocks may connect, chain together, or create communication services.

NFV may rely upon traditional server-virtualization techniques, such as the server-virtualization techniques used in enterprise IT. The NFV may differ from traditional server-virtualization techniques, such as the server-virtualization techniques used in enterprise IT. A virtualized network function (VNF) may comprise one or more virtual machines. The one or more virtual machines may run different software and processes. For example, the one or more virtual machines may run different software and processes on top of one or more of the following: standard high-volume servers, switches and storage, cloud computing infrastructure, and/or the like. The VNF may or may not have custom hardware appliances for a network function.

The NFV framework may comprise one or more of the following components: VNFs, Network function virtualization infrastructure (NFVI), and Network functions virtualization management and orchestration architectural framework (NFV-MANO Architectural Framework). VNFs may be software implementations of network functions. The network functions may be deployed on a NFVI. A NFVI may be a combination of hardware and software components that build the environment where VNFs are deployed. The NFV infrastructure may span one or more locations. The network may provide connectivity among these locations. The network may be regarded as part of the NFV infrastructure. The NFV-MANO architectural framework may be the collection of one or more of the following: some or all functional blocks, data repositories used by these blocks, reference points and interfaces, and/or the like. The functional blocks may exchange information through the collection. For example, the functional blocks may exchange information through the collection for the purpose of managing and orchestrating NFVI and VNFs.

A building block for the NFVI and/or the NFV-MANO may be a NFV platform. For example, when working as a building block for the NFVI, the NFV platform may comprise virtual and physical processing and storage resources, and/or virtualization software. When working as a building block for the NFV-MANO, the NFV platform may comprise VNF and NFVI managers and/or virtualization software operating on a hardware controller. The NFV platform may implement carrier-grade features. The carrier-grade features may be used to do one or more of the following: to manage and monitor platform components, to recover from failures, to provide effective security, and/or the like. A public carrier network may use some or all described herein.

SDN may be related to NFV. SDN may refer to different domains. SDN may be an approach to building data networking equipment and software. The software may separate and abstract elements of these systems. For example, the software may decouple the control plane and the data plane from each other, such that the control plane may reside centrally and the forwarding components may remain distributed.

The control plane may interact in various direction (e.g., both northbound and southbound). For example, in the northbound direction, the control plane may provide a common abstracted view of the network to higher-level applications and programs that use application program interfaces (APIs). In the southbound direction, the control plane may program the forwarding behavior. The control plane may use device level APIs of the physical network equipment that is distributed around the network.

NFVs may or may not depend on SDN or SDN concepts. A VNF may be implemented as a standalone entity. For example, a VNF may be implemented as a standalone entity based on conventional networking and orchestration paradigms. Leveraging SDN to implement and manage an NFV infrastructure may be used. For example, leveraging SDN concepts to implement and manage an NFV infrastructure may be used in the area of the management and orchestration of VNFs.

An NFV infrastructure may go beyond an adaptation of conventional network functions and/or running on off-the-shelf hardwares. An NFV infrastructure may use a central orchestration and management system. The central orchestration and management system may take operator requests associated with a VNF and/or translate the operator requests into appropriate processing, storage and network configurations. The appropriate processing, storage and network configurations may be used to bring the VNF into operation. Once in operation, the VNF may be be monitored for security, capacity and utilization. The VNF may be adapted.

Some or all the above functions may be accomplished using SDN concepts. An NFV may be a primary SDN application in service provider environments.

A network slice (e.g., a 5G slice) may support the communication service of a connection type with a way of handling the C- and U-plane for this service. For example, a network slice (e.g., a 5G slice) may support the communication service of a connection type with a way of handling the C- and U-plane for the service. A 5G slice may comprise a collection of 5G network functions. A 5G slice may comprise specific RAT settings. The collection of 5G network functions and the specific RAT settings may be combined. The combination may be for a use case or a business model. A 5G slice may span one or more of the following domains of the network: software modules running on cloud nodes, specific configurations of the transport network supporting flexible location of functions, a dedicated radio configuration or even a specific RAT, a configuration of the 5G device, and/or the like. Slices may or may not contain the same functions. One or more functions that may be used today may or may not be used in one or more of the slices. A 5G slice may provide the traffic treatment for a use case. For example, a 5G slice may be tailored to provide certain traffic treatment defined to satisfy one or more use cases. The 5G slice may avoid or support other functionality that may be less tied to the use cases associated with that 5G slice. The slices may be flexible. The flexibility behind the slice may be a key enabler to a variety of activities. For example, the flexibility behind the slice may be a key enabler to expanding businesses and creating businesses. Third-party entities may be given permission to control some or all aspects of slicing (e.g., through a suitable API). The permission may be given third-party entities for them to provide tailored services.

For example, a 5G slice for a smartphone use may be realized by setting fully-fledged functions distributed across the network. Security, reliability and latency may be implemented for a 5G slice supporting automotive use case. For the slice supporting automotive use case, some or all functions (e.g., potentially dedicated functions) may be instantiated at the cloud edge nod. For example, such functions may include a vertical application due to latency constraints. The functions may include the vertical application due to latency constraints. To allow on-boarding of such a vertical application on a cloud node, open interfaces may be defined. Sufficient open interfaces may be used. For a 5G slice supporting massive machine type devices (e.g., sensors or IoT devices), some basic C-plane functions may be configured. Some functions may be omitted. For example, mobility functions with contention-based resources for the access may be omitted. Some dedicated slices may operate in parallel. A slice may be used to provide basic best-effort connectivity and/or to cope with use cases and traffic. The 5G network may contain functionality that ensures controlled and secure operation of the network end-to-end. For example, the 5G network may contain functionality that ensures controlled and secure operation of the network end-to-end, irrespective of the slices to be supported by the network. The 5G network may contain functionality that ensures controlled and secure operation of the network end-to-end at some circumstances.

Dedicated infrastructure resources for certain slices may be used. Shared infrastructure resources and functions between multiple slices may be used. An example of a shared function may be a radio scheduler. The scheduler of a RAT may be shared among multiple slices. The scheduler of a RAT may play a role in allocating resources and setting the performance of a 5G slice. Allocation resources and setting performances of the 5G slice may include the extent to which consistent user experience is realized. The scheduler implementation in networks may be proprietary. A level of openness may be used to have sufficient control over the function.

To realize such 5G system architecture, the C- and U-plane functions may be separated. For example, the C- and U-plane functions may be separated in accordance with SDN principles. Open interfaces between the C- and U-plane functions may be defined. Open interfaces may be defined between access-specific and access-agnostic functions such that additional access technologies may be integrated into the 5G network. The additional access technologies may be fixed and/or radio access technologies. The fronthaul interface(s) between remote radio units and baseband units may be open and/or flexible. The fronthaul interface(s) may offer multi-vendor operation and/or good forward and backward compatibility. The fronthaul interface(s) may provide options for transport bandwidth reduction. The interfacing between functions may allow for multi-vendor provisioning of different functions.

The granularity at which functions are defined may be identified in a system architecture. Finer granularity may improve flexibility. Finer granularity may lead to complexities. Testing efforts for different function combinations and slice implementations may be cumbersome. Interworking issues among different networks may arise. The granularity to balance flexibility with complexity may be identified. The granularity may influence how the eco-system delivers solutions.

Distributed mobility management may be used. In a centralized mobility scheme, the mobility anchor may be centrally placed in the network. The mobility anchor may manage the traffic for a plurality of mobile devices. The EPC's GTP-based mobility may be an example of the centralized mobility scheme. The centralized mobility anchor may be used. The traffic route may be optimized. The scalability and/or the capacity of the network may be worked on. The centralized scheme may or may not accommodate trends such as flatter architecture, content delivery network, etc.; the centralized scheme may have a single point of failure or attack; and/or the like.

Distributed mobility management (DMM) may be used to enable the traffic to avoid traversing a single mobility anchor far from the optimal route. The User Plane (UP) function of mobility anchors may be distributed and located close to the device. The control function of the mobility anchor may be centralized. The characteristics of a DMM architecture may include one or more of the following: multiple distributed anchoring, dynamic anchor assignment/relocation, by passable network-layer mobility, and/or the like. Multiple distributed anchoring may include the ability to anchor different sessions of a mobile node at different anchors. Dynamic anchor assignment/relocation may include the ability to assign the initial anchor, dynamically change the initial anchor, and/or assign an additional anchor. Network-layer mobility support may be bypassable for an application session. The mobility protocols such as MIP, PMIP may be used for implementing DMM. GTP-based distributed mobility management may be used.

Support may be implemented for flexible and on-demand mobility management. Support may be implemented for multiple mobility mechanisms in the same network. The core network since 2G to 4G may be and optimized for mobile phone services. The mobility management mechanism and procedures may be common for some or all the devices in the network. Some or all the devices may report their current locations when moving. The mobility management mechanism and procedures may use NW-controlled mobility protocols (e.g., GTP) to ensure session continuity. The mobility management mechanism and procedures may work when some of the devices are mobile phones and/or when some of the devices share the similar mobility characteristics. Non-mobile-phone devices, such as IoT devices or smart vehicles, may constitute a part of the network. Non-mobile-phone devices may differ from mobile phones. For example, their mobility characteristics may differ. The IoT devices may be stationary and/or nomadic. The session continuity may or may not be utilized in all situations and/or may be different for some types of applications. The vehicles or Unmanned Aerial Vehicles may move faster than ordinary mobile phones. The session continuity requirements for them may be more stringent due to their mission-critical purpose. The current EPC mobility management mechanism may or may not be sufficient and/or efficient for the devices described herein. It may be difficult to apply a unified mechanism for some or all the devices in the network.

The requirements on mobility support may vary depending on the application and services used by a device (e.g., a same device). An IP address may change when devices move. Some or all of the applications may be able to handle the IP address change and/or to ensure the service continuity with or without the network mobility support. Mobility on demand may be provided. For example, mobility on demand may be provided for some devices and services while other types of mobility support may be provided for other devices. A network may use a mechanism that allows the network to flexibly choose mobility management mechanisms for various devices and tailor the mobility support based on the applications running on the devices.

Network slice oriented mobility support may be provided for devices of various mobility characteristics. Devices of various mobility characteristics may demand different network mobility support. Devices running various services/applications may demand different network mobility support. The network may support different mobility mechanisms in parallel. For example, a network may support both NW-based mobility and Client-based mobility at the same time. The network may use GTP protocol to support the NW-based mobility, and use the DSMIP to support Client-based mobility. A network may support a number of variants (e.g., for the same mobility mechanism). For example, the GTP-based mobility may use a centralized mobility anchor. A network may support further evolvement which uses distributed mobility anchor. The network may allow the devices to change the devices' mobility anchors as they move around.

Figure 3:
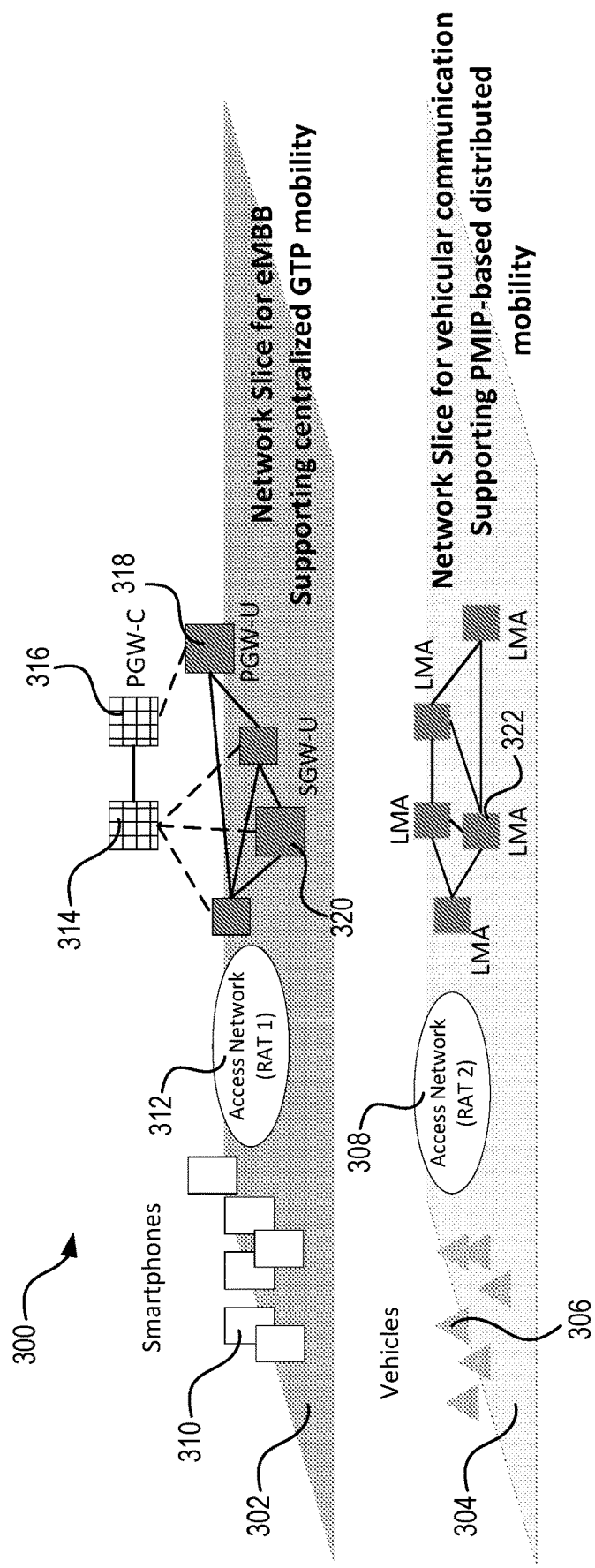
FIG. 3 illustrates an example of supporting a unique mobility management mechanism in a specific network slice.

A network slice may support a mobility mechanism or multiple mobility mechanisms. Different network slices may support the same or different mobility mechanism(s). A network slice (e.g., a 5G slice) may support the communication service of a connection type with a way of handling the C- and U-plane for this service. A 5G slice may comprise a collection of 5G network functions. A 5G slice may comprise various RAT settings. The collection of 5G network functions and the specific RAT settings may be combined. The combination may be for a certain use case or a business model. Assigning and chaining a set of network functions to a network slice may enable a slice to support a mobility mechanism. FIG. 3 illustrates an example 300 of supporting a unique mobility management mechanism in a specific network slice. In FIG. 3, a network slice 302 for the evolved mobile broadband (eMBB) service may continue to use the legacy centralized GTP-based mobility. The network slice 302 for the evolved mobile broadband (eMBB) service may be accessed through AN 312. A set of P-GW function 314-318, SGW function 320, and MME function may be instantiated for the network slice 302. A set of P-GW function 314-318 may comprise separated CP/UP functions, PGW-C 314-316, and PGW-U 318. SGW function 320 may comprise separated CP/UP functions, SGW-C, and SGW-U. In a network slice 304 for vehicular communication services, a PMIP-based distributed mobility management may be adopted. The network slice 304 for the evolved mobile broadband (eMBB) service may be accessed through AN 308. Corresponding network functions such as Local Mobility Anchors (LMA) 322 may be deployed in the network slice 304.

Figure 4:
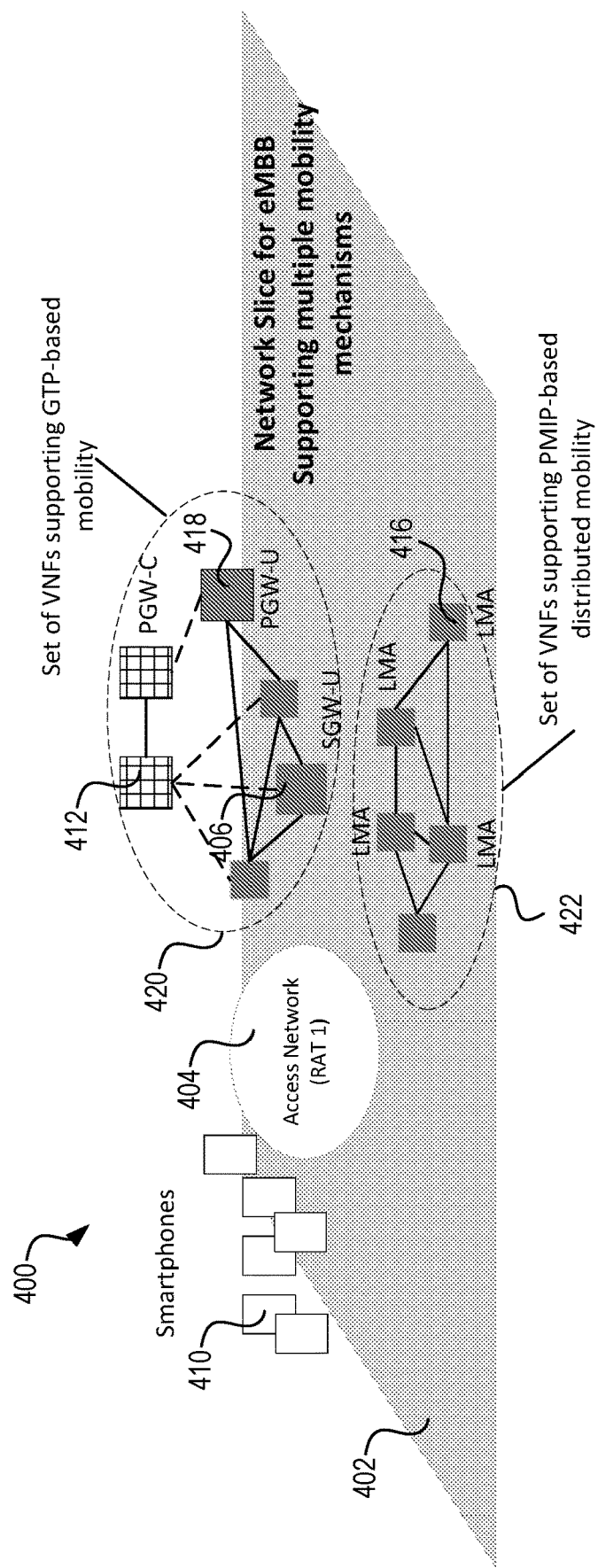
FIG. 4 illustrates an example of supporting multiple mobility management mechanisms in a specific network slice.

A network slice may support more than one mobility mechanisms. The network slice may deploy multiple sets/chains of network functions to support different mobility mechanisms. FIG. 4 illustrates an example 400 of supporting multiple mobility management mechanisms in a specific network slice. In FIG. 4, a network slice 402 is for the evolved mobile broadband (eMBB) service and for a PMIP-based distributed mobility management. The network slice 402 may be accessed through access network 404 and for smartphones 410. The network slice 402 may comprise VNFs 420 that support the legacy centralized GTP-based mobility and VNFs 422 that support PMIP-based distributed mobility. The VNFs 420 may comprise a set of P-GW function 412 and 418, SGW function 406, and MME function that may be instantiated for the network slice 402. A set of P-GW function 412 and 418 may comprise separated CP/UP functions, PGW-C 412, and PGW-U 418. SGW function 406 may comprise separated CP/UP functions, SGW-C, and SGW-U. The VNFs 422 may comprise Local Mobility Anchors (LMA) 416.

The network slice may comprise the supported mobility mechanism(s) and other slice attributes or configurations. The supported mobility mechanism(s) and other slice attributes or configurations may be made aware to the devices served by the network slice. For example, the network may broadcast the information about the supported mobility mechanism(s) and other slice attributes or configurations as system information. The network may return the information. For example, the network may return the information when a device attaches or registers (e.g., firstly attaches or registers) on the network. A device may retrieve the information from a server (e.g., access network discovery and selection function (ANDSF) server) or database. The device may use the network-slice supported mobility mechanism to evaluate whether the device may access/connect with a network slice. The device may evaluate based on one or more of the following: the device's own mobility characteristics, the device's ability to support/implement the mobility mechanisms, the requirements of the applications/services, and/or the like. The device and the network may agree to use a mechanism. For example, the device and the network may agree to use a mechanism if more than one mobility mechanisms are supported. How a device may select a network slice and negotiate the mobility mechanism to use may be described herein.

Figure 5:
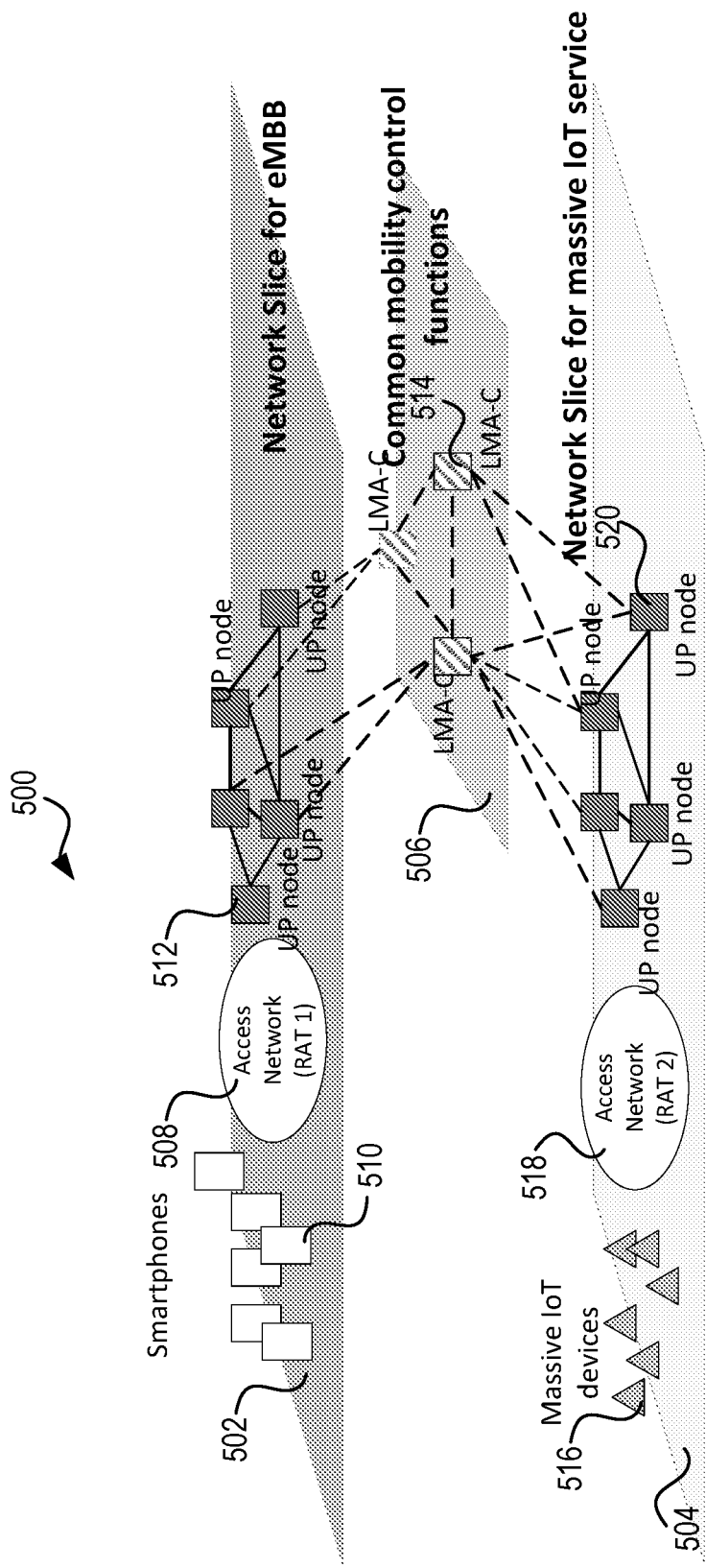
FIG. 5 illustrates an example of multiple network slices sharing the control functions for a common mobility management mechanism.

Multiple network slices may adopt the same mobility support mechanism. Multiple network slices may share the same set of mobility control functions. The mobility control function may or may not belong to an individual network slice. FIG. 5 illustrates an example 500 of multiple network slices sharing the control functions for a common mobility management mechanism. For example, a network slice for eMBB service 502 and a slice for massive internet of things (IoT) service 504 may differ in one or more of the following characteristics: amount of devices, quality of service (QoS) requirements and support, charging, and/or the like. The network slice 502 for smartphones 510 is for eMBB service and may be accessed through AN 508. The network slice 504 is for massive internet of things (IoT) service 516 and may be accessed through AN 518. The network operator may determine that the PMIP-based distributed mobility is suitable for both network slices 502 and 504. The network may instantiate mobile access gateway (MAG) and link management agent (LMA) functions 514. The MAG and LMA functions may serve both slices 502 and 504. The MAG and LMA functions 514 may be on a network slice 506 and/or may serve both slices 502 and 504 when the control plane (CP) and user plane (UP) functions of the mobility control elements are separated. The UP nodes 512 may belong to network slice 502. The UP nodes 520 may belong to network slice 504. The UP nodes 512 and the UP nodes 520 are not shared among slices 502 and 504. The mobility CP nodes (e.g., the MAG and LMA functions 514) may be shared by slices 502 and 504.

Within one or more network slices, one or more mobility mechanisms may be associated with and/or be used to support one or more mobility schemes. A mobility mechanism may include functions, and rules, and/or procedures according to which the functions support the mobility schemes.

A mobility mechanism may include a set of network functions/elements. For example, in the LTE, EPC may use (e.g., basically use) GTP-based mobility mechanism. GTP-based mobility mechanism may include the PDN gateway (P-GW), serving gateway (S-GW), and eNB. The P-GW may operate as a mobility anchor. The S-GW may provide intermediary GTP tunnel endpoints for scalability. The eNB may operate as an access network for the WTRU.

Different mobility mechanism may use different functions. Different sets of network functions may be used by different mobility mechanisms (e.g., mobility support mechanisms). Different sets of network functions may support various mechanisms in parallel. Different mobility mechanisms may co-exist. For example, a client-based hierarchical mobile IP mobility mechanism may be different from a GTP-based mobility mechanism. For example, the client-based hierarchical mobile IP may use functions such as home agent (HA), local mobility anchor point (MAP), etc. The network virtualization and SDN technologies may enable the network to instantiate different sets of network functions, for example in order to support different types of mobility mechanisms for differ WTRUs and/or different services/slices.

A mobility mechanism may include a set of rules and procedures. For example, in LTE EPC, the GTP-based mobility management may comprise a set of rules and/or procedures that include one or more of the following steps and/or actions. A WTRU may attach to a centralized mobility anchor (e.g., P-GW in EPC). The WTRU may be assigned an IP address per PDN connection. A local serving GW may be selected as the intermediary GW. GTP tunnels may be established between access gateway (e.g., eNB), S-GW, and/or P-GW. The WTRU may be idle and may update a location related to the WTRU with the network. A different S-GW may be selected, and/or tunnels may be re-established through the different S-GW. The network may trigger a handover procedure. The GTP tunnels may be switched to a different eNB, for example when the connected WTRU moves to the different eNB.

A mobility mechanism may include different and/or additional rules and/or procedures and/or implementations. A mobility mechanism may adapt to various types of mobility of devices. For example, an architecture and/or system may support distributed mobility anchors. Some or all of the distributed mobility anchors may be closer to network edges. A WTRU may move and/or may switch mobility anchors. When a WTRU moves, the WTRU may select a mobility anchor that is different from the mobility anchor to which the WTRU was previously attached. The different mobility anchor may be closer to the location the WTRU has moved to than the mobility anchor to which the WTRU was previously attached. The WTRU may be connected through multiple mobility anchors for a common/single PDN connection. Inter-mobility-anchor tunnels may be used. The WTRU may switch data path from one mobility anchor to another.

A mobility mechanism may include different and/or additional rules and/or procedures and/or implementations without changing a core of the mobility mechanism. For example, in an architecture (e.g., EPC architecture), the mobility anchor may be centralized. A plurality of devices (e.g., many thousands of devices) may share the same anchor. For example, multiple WTRUs may be attached to an anchor. Multiple WTRUs may remain attached to the same anchor for an extended period of time. An architecture may support distributed mobility anchor. Supporting distributed mobility anchor may or may not change the core of the mobility mechanism. For example, the core of the mobility mechanism may be based on GTP and secondary (or third, fourth, etc.) may be used to supplement the core mobility mechanism. For example, the secondary mobility mechanisms may be used to support different types of services and/or different classes/types of WTRUs.

The support for multiple mobility management mechanisms and multiple variants of a mobility mechanism may enable the network to tailor mobility support to various types of devices. Examples of variants of mobility mechanisms may include one or more of the following. For PMIP based mobility management, the mobility mechanism may support distributed anchoring. For MIP based mobility management, the mobility mechanism may support different modes like bi-directional tunneling (BT) mode, route optimization (RO) mode, and/or the like. The network and the device may come to an agreement on what the mobility support may be.

Mobility management may be implemented using different types of mobility parameters and/or values for the mobility parameters. A mobility parameter may correspond to a characteristic of a mobility scheme. One or more of the mobility parameters and/or values for the mobility parameters may be configured to be used in a given mobility scheme. A mobility template (MT) may be used to request and/or configure certain mobility parameters for one or more mobility schemes. For example, the mobility scheme may define an overall mechanism used to support WTRU mobility and may be described in terms of a mobility level (ML) and/or mobility pattern (MP). The mobility scheme may include a set of mobility parameters whose values may be determined by a core network (CN), a WTRU, and/or a negotiation of the CN and the WTRU. The mobility scheme may include a set of selected mobility parameters and corresponding values for the selected mobility parameters (e.g., in a mobility scheme in a form of a mobility pattern). The mobility scheme may include a set of selected mobility parameters and/or corresponding values for the selected mobility parameters for use by a WTRU associated with a particular mobility level. Examples of mobility levels for a WTRU may include a stationary mobility level, a low or slow mobility level, a standard/regular mobility level, a high mobility level, etc. The mobility level may be characterized by the relative level of expected mobility for a given type of WTRU. Different mobility parameters and/or different mobility schemes may be applied to different mobility levels. The types of service being used by the WTRU may affect the configuration of the mobility parameters and/or the selection of a mobility level for a WTRU. The mobility scheme may be defined for a type of devices or services.

Mobility parameters may comprise characteristics of the mobility support that the network may provide for target devices or services. A mobility scheme may characterized by one or more mobility parameters. For example, a mobility scheme may be characterized by a mobility parameter corresponding to the type of mobility management protocol to be used. For example, the type of mobility management protocol mobility parameter may correspond to GTP, DSMIP, PMIP, etc. A mobility scheme may be characterized by a mobility parameter corresponding to whether or not distributed mobility management is supported. A mobility scheme may be characterized by a mobility parameter corresponding to whether IP address changes are supported. A mobility scheme may be characterized by a mobility parameter corresponding to whether route optimization is supported. A mobility scheme may be characterized by a mobility parameter corresponding to whether inter-anchor tunneling is supported. A mobility scheme may be characterized by a mobility parameter corresponding to whether high-speed mobility is supported. A mobility scheme may be characterized by a mobility parameter corresponding to whether group mobility is supported. A mobility scheme may be characterized by a mobility parameter corresponding to the types of security mechanisms to be used. Other examples of mobility parameters used to define a mobility scheme are also described elsewhere herein.

The mobility scheme (e.g., and/or one or more mobility parameters for the mobility scheme) may be selected and/or based on information about service to be used by the WTRU. For example, the mobility scheme may be generalized to include the service related information. In one or more of the embodiments, the service related information may be indicated by a device in the mobility scheme when negotiating or requesting the mobility scheme. The service related information may be incorporated in the mobility scheme as mobility parameters. The service related information may incorporated in the mobility scheme in addition to the mobility parameters described herein.

The service related information may be used to select the mobility scheme. The service related information may be used (e.g., by the network) to assign one or more network slice(s) to a WTRU. For example, the network may use the service related information to assign one or more mobility schemes and/or network slice(s) to a WTRU to meet the service requirements of the WTRU. The service related information that may be used to assign one or more mobility schemes may include information about a type(s) of service(s) to be used by a device. The information about the type(s) of service(s) to be used by the device may indicate whether the device may use IP or Non-IP services. The information about the type(s) of service(s) to be used by the device may indicate whether the primary service used by the device include one or more of the following: instance voice, video, mission critical, public safety and/or the like. The service related information that may be used to assign one or more mobility schemes may include information about a type(s) of application(s) to be used by the device. The information about a type(s) of application(s) to be used by the device may be about the application(s) that are installed, running, and/or operated on the device. The information about a type(s) of application(s) to be used by the device may include the application ID(s) of the application(s). The service related information that may be used to assign one or more mobility schemes may include information about a type(s) of the device. The information about a type(s) of the device may indicate characteristics of the device. The information about a type(s) of the device may indicate whether the device may be associated with one or more of the following: wearable device, gateway device, regular smartphone, healthcare device, and/or the like.

Radio access technology (RAT) information associated with the WTRU may be an example of a mobility parameter. For example, a mobility scheme may be based on one or more of the following mobility parameters related to RAT information. For example, a mobility parameter(s) may correspond to whether intra-radio access technology (RAT) mobility is supported, whether inter-RAT mobility is supported, whether session continuity is supported, and/or the like. The mobility parameter(s) corresponding to whether intra-radio access technology (RAT) mobility is supported may indicate whether intra-radio access technology (RAT) mobility is supported. The mobility parameter(s) corresponding to whether inter-RAT mobility is supported may indicate whether inter-RAT mobility is supported. The mobility parameter(s) corresponding to whether session continuity is supported may indicate whether session continuity is supported.

The mobility parameter(s) corresponding to whether inter-RAT mobility is supported may indicate that the inter-RAT mobility is supported. If inter-RAT mobility is supported, the mobility scheme may indicate the RAT(s) across which the inter-RAT mobility is supported. If inter-RAT mobility is supported, the mobility scheme may indicate a direction (e.g., the direction from a source RAT to a target RAT) in which the inter-RAT mobility is supported. If inter-RAT mobility is supported, the mobility scheme may indicate the priority for a RAT across which the inter-RAT mobility is supported. The priority for a RAT across which the inter-RAT mobility is supported may apply when multiple target RATs exist. The priority for a RAT may indicate the priority of mobility in which the RAT is attempted and/or selected among the multiple RATs (e.g., from one RAT to another RAT). For example, the system may pick a target RAT that has a higher priority than the other RATs for the mobility scheme. The mobility scheme may indicate the information associated with the preferred conditions when the inter-RAT mobility is supported. For example, the information associated with the preferred conditions may address unavailability of a QoS. The unavailability of a first QoS may trigger a mobility to another RAT to achieve the same QoS as the first QoS or a relatively lower QoS than the first QoS.

The mobility parameter(s) corresponding to whether session continuity is supported may indicate that session continuity is supported by the system (e.g., the 3GPP system). If session continuity is supported by the system (e.g., the 3GPP system), the mobility scheme may contain a request for a public IP address. The mobility scheme may contain an indication regarding whether session continuity is supported for intra-RAT mobility, inter-RAT mobility (e.g., whether session continuity is supported across a set of RATs) if session continuity is supported by the system (e.g., the 3GPP system). The mobility scheme may include information about the class of applications for which session continuity is supported. The mobility scheme may include information about the QoS level to which supported session continuity is applicable. For example, session continuity support may be supported for a connection with a particular/identified QoS. For example, an indication may be applicable to a connection (e.g., particular connection) with the indicated QoS level (at least one QoS level). The mobility scheme may include information about a set of application ID for which supported session continuity is requested The mobility parameter(s) corresponding to whether session continuity is supported may indicate that session continuity is not supported by the system (e.g., the 3GPP system). If session continuity is not supported, the mobility scheme may include an indication about whether session continuity on the application level is supported by the device. If application level session continuity is supported, the mobility scheme may indicate the type of solutions supported (e.g. mobile IP, dual stack mobile IP, SIP, etc.). The mobility scheme may indicate the class of applications for which session continuity is supported. The mobility scheme may indicate the QoS level for which session continuity is applicable. For example, the indication may be applicable to a particular connection with the indicated QoS level. The mobility scheme may indicate a set of application IDs for which session continuity is requested.

The mobility parameter may include information about a paging strategy. The paging strategy for a high mobility WTRU may differ from the paging strategy used for a stationary WTRU. The identity of the serving RAN node may be used in a paging strategy. The paging strategy may use a RAN node (e.g., an identity of a serving RAN node) for reaching the WTRU.

The mobility parameter may include information about location tracking. The location tracking may be performed through a list (e.g., an identified list). The information about location tracking and/or the list may indicate restrictions for service areas and/or locations. A size of mobility restriction area may be included in subscription information. For example, service areas or locations covered by RAN nodes in the list may be non-restricted areas. Mobility for the WTRU may be executed in the service areas and/or locations without restrictions. Mobility for the WTRU may not be executed in the service areas and/or locations with restrictions (e.g., non-allowed or forbidden areas). For example, an eNB may configure the WTRU to perform measurements in the areas without restriction. The eNB may configure the WTRU not to perform measurements in the areas with restriction.

The mobility scheme and/or mobility parameters may indicate information about one or more of the following for a form of mobility that is supported: the geographical area within which mobility is expected and/or the time during which mobility is expected and/or not expected and/or a mode in which mobility is expected and/or not expected. The time during which mobility is expected and/or not expected mobility may be per a given location/area, per RAT, and/or the like.

Mobility schemes and/or the mobility parameters described herein may be provided for one or more of the following: internet traffic, traffic that goes between devices (e.g., traffic that goes directly between devices using proximity services), traffic per access point name (APN), traffic per PDN type, and/or the like. Mobility scheme may include a subset of information and/or mobility parameters described herein or a combination of information and/or mobility parameters described herein. Mobility scheme may contain other information and/or mobility parameters. The network may take into account the information and/or mobility parameters described herein when deciding to assign a type of mobility scheme to the WTRU (e. g, as described herein).

Mobility scheme may be implemented in one or more ways including static implementation, dynamic implementation, and/or the like. In a static mobility scheme, a setting in the scheme may be fixed (e.g., predefined or configured). A change of a setting in the static mobility scheme may result in a different mobility scheme. For example, two different static mobility schemes A and B may have same settings/mobility parameters except that A may support distributed anchoring while B may not support distributed anchoring.

An example of a mobility scheme may be a mobility pattern that include a set of one or more selected mobility parameters and corresponding values for the selected mobility parameters. A change of value for a selected mobility parameter for the mobility pattern may result in a different mobility pattern. In one or more embodiments, a first mobility pattern and a second mobility pattern may have a same set of mobility parameters. All but one values for the set of mobility parameters may be the same for the first and the second mobility patterns. The first mobility pattern and a second mobility pattern are different mobility patterns based on the different value.

The network or MME may identify one or more static mobility schemes for one or more devices (e.g., based on approaches described herein). The static mobility schemes may be assigned a name or identifier. The static mobility schemes may be assigned an index number. The devices and the network may refer to the mobility schemes the using indexes or identifiers.

In a dynamic mobility scheme, the settings in the mobility scheme may or may not be fixed (e.g., predefined). The settings in the mobility scheme may be dynamically determined when the device accesses the network. A change of a setting in the dynamic mobility scheme may not result in a different mobility scheme. For example, a first dynamic mobility scheme and a second dynamic mobility scheme may have a same set of mobility parameters. One parameter of the set of the mobility parameters in the first scheme may have a first value. The same parameter in the second scheme may have a second value. The first value and the second value may be different. The first dynamic mobility scheme and the second dynamic mobility scheme may be the same.

The network or a device (e.g., a target device) may determine a mobility scheme for a target device. The network may perform the determination of the mobility scheme for the target device without negotiating with the device (e.g., the target device). The determination of the mobility scheme device may be made through negotiation between the network and the target device. The determination may be made based on mobility information. The mobility information may include one or more capabilities of the target device, one or more mobility properties of the target device, subscription information related to the target device, network policy information related to the target device, and/or the like. The subscription information may indicate whether the WTRU is subscribed for mobile originating connectivity services, mobile terminating connectivity services, location-based services, or roaming services. The network policy information may indicate an allowed geographical area for the WTRU, speed restrictions for the WTRU, access time restrictions for the WTRU, or allowed connectivity modes for the WTRU.

The network may perform the determination of the mobility scheme device without negotiating with the device (e.g., the target device). The network may assign a mobility scheme and/or the settings of the mobility scheme to the target device based on the mobility information. The assignment of the mobility scheme and/or the settings of the mobility scheme to the target device may be through a network entity (e.g., an MME). The network entity may gather the mobility information from a server (e.g., a HSS). For example, the target device may upload mobility information including mobility properties and capabilities to the HSS during registration. The subscription and the network policy information may be stored on the same HSS or a different server.

For example, the network (e.g., through MME) may determine which network slice is suitable based on a selected mobility scheme. If a selected network or network slice implements a single mobility management mechanism, the mobility mechanism may be fixed after the network or network slice is selected. Negotiation of mobility schemes between the device and the network may or may not go further. If the selected network or network slice supports multiple mobility mechanisms or supports multiple variants of a mobility mechanism, the device may further negotiate with the network for a mobility scheme to use. A device may determine which network slice is suitable based on the device's own capability, mobility characteristics/properties and the device's services/applications.

When the network uses some or all settings that are not related to the device's capabilities and/or mobility characteristics and/or services, the network may assign the mobility scheme and/or the settings without negotiating with the target device. When a network or a network slice supports multiple mobility schemes settings, a mobility scheme (e.g., one of the mobility schemes) may be designated as the default mechanism. The device may access (e.g., directly) network functions of the default mobility mechanism without negotiation.

The determination of the mobility scheme may be made through negotiation between the network and the target device. The determination of the mobility scheme may be connected with a selection of a network slice. The mobility schemes supported by a network slice may be fixed. A selection of a mobility scheme may be performed with a selection of a network slice. For example, a selection of the mobility scheme may be performed with a selection of a network slice when the network is organized with network slicing technologies. A target device (e.g., a WTRU) may be expected to be connected and/or served by a network slice.

The mobility scheme(s) that a network or network slice supports may be broadcasted in the system information with other network or network slice configurations. A device may retrieve available network slices and their configurations including the supported mobility scheme(s) from a local access network or access gateway. A device may retrieve available network slices and their configurations including the supported mobility scheme(s) from a central server such as an ANDSF server.

A device may receive the supported mobility schemes of the available network slices. A device may determine which network slice is suitable based on the device's own capability, mobility characteristics and the device's services/applications. If the selected network or network slice implements a single mobility management mechanism, the mobility mechanism may be fixed after the network or network slice is selected. Negotiation of mobility schemes between the device and the network may or may not go further. If the selected network or network slice supports multiple mobility mechanisms or supports multiple variants of a mobility mechanism, the device may further negotiate with the network for the mobility scheme to use.

As shown in the example (FIG. 6), a device (e.g., 602) may include preferred mobility scheme settings (e.g., mobility parameters and corresponding values for the mobility parameters) in the initial attach messages (e.g., 608) to the access GW (e.g., 604). The preferred mobility parameters and/or parameter values may be indicated using a mobility template. The mobility template may be specific to a certain service or slice or may be for multiple services or slices. The service or slice information may be included in the mobility template.

The initial attach message (e.g., 608) may include PMIP, distributed, route-optimization etc. The access GW (e.g., 604) may forward the initial attach messages (e.g., 608) to the mobility control function (e.g., 606). The network may approve the device's preference. The mobility control function (e.g., 606) may send an attach accept message (e.g., 610) to the access GW (e.g., 604). The access GW (e.g., 604) may forward the attach accept message (e.g, 610) to device (e.g., 602). The network (e.g., mobility control function 606) may modify a part of the settings based on network conditions or preference and/or return the modified settings to the device (e.g, 602). Negotiation exchanges may go back and forth for one or more times between the network (e.g., mobility control function 606) and the device (e.g., 602). The network (e.g., mobility control function 606) and the device (e.g., 602) may come to an agreement on mobility settings (e.g., mobility parameters and corresponding values for the mobility parameters).

In the device context, the settings may be stored in the related network elements/functions, or carried in the device-initiated messages/signaling. The network may direct the handling to the specific network functions/elements that provide the required mobility support.

Figure 6:
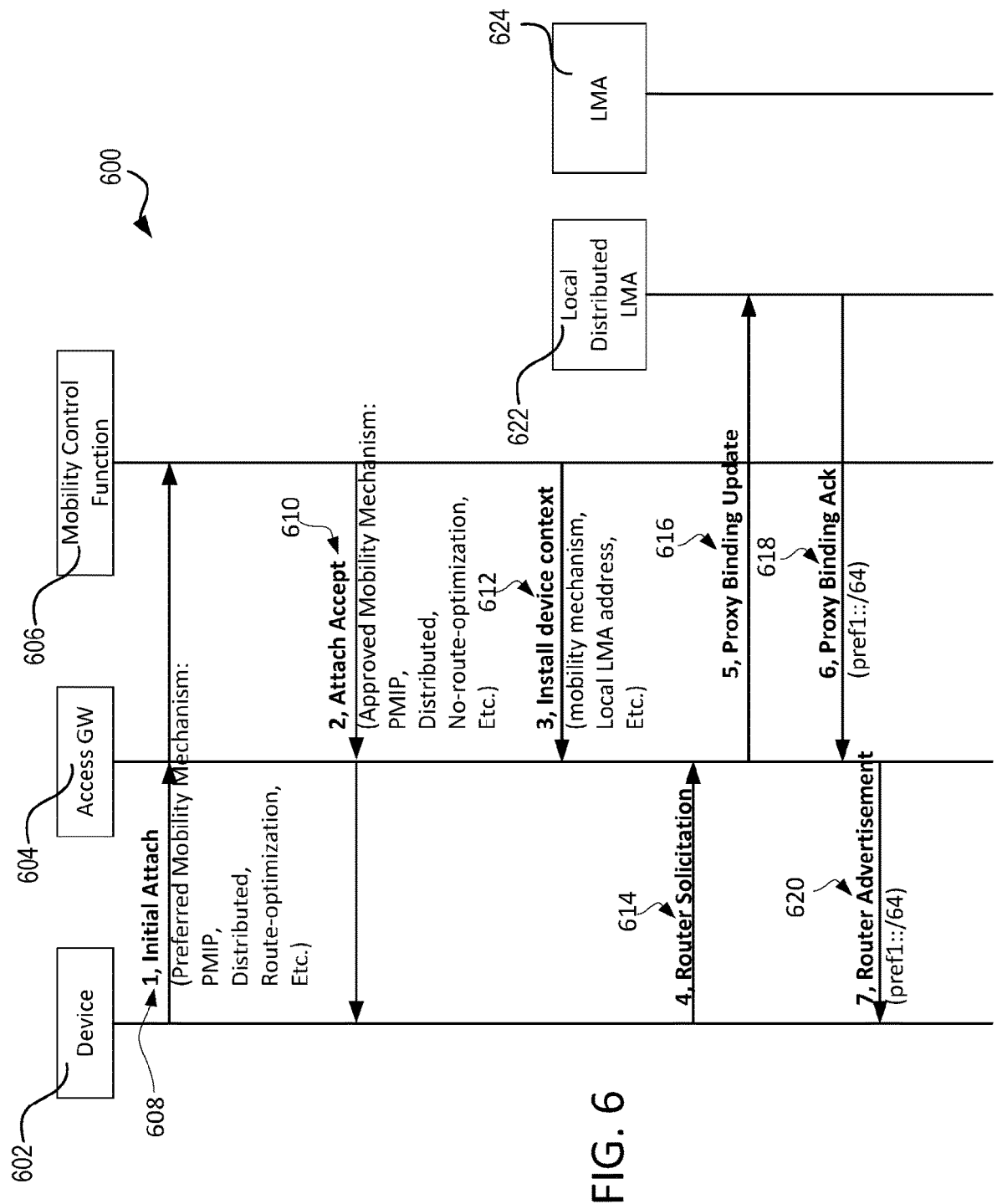
FIG. 6 illustrates an example of the mobility scheme negotiation procedure.

If the static mobility schemes are used, the device and the network may use the identifier or index of the templates in the negotiation procedure (e.g., instead of detailed settings). A device may or may not indicate mobility scheme settings (e.g., any mobility scheme settings) in the initial message. A device may indicate one or more of the following: the device's capabilities, the device's mobility characteristics (e.g., low-mobility or high-mobility), the device's requirements of higher layer applications, and/or the like. The network may select suitable mobile template settings for the device. FIG. 6 may illustrate an example of the mobility scheme negotiation procedure described herein.

In FIG. 6, the device 602 may include preferred mobility scheme settings in an initial attach message 608 to the network. A mobility control function 606 (e.g., virtualized mobility control function) in the core network may handle the mobility scheme negotiation. The initial attach message 608 may include PMIP, distributed, route-optimization etc. Attach events 608 including the device's mobility scheme preferences may be forwarded to the mobility control function 606.

The mobility control function 606 may approve the device's 702 preferences. At 610, the mobility control function 606 may return the approved/modified settings to the device 602 in an attach acceptance message 610. The attach acceptance message 610 may include PMIP, distributed, no-route-optimization etc. The device 602 may confirm the device's acceptance of the modifications in one or more additional messages. The mobility control function 606 may or may not approve a route-optimization option.

At 612, the mobility control function 606 may install the device context in the access gateway 604. The distributed mobility anchor may be used. The mobility control function 606 may select an appropriate local LMA function 622. The mobility control function 606 may select an appropriate LMA function 624. The local LMA function 622 may co-locate in the same access gateway 604. The mobility control function may install the LMA address as part of the device mobility context at 612. The device may initiate an IPv6 router solicitation procedure at 614. Based on the mobility settings in the access gateway 604, the access gateway 604 may initiate a PMIP proxy binding update (PBU) procedure at 616 with the assigned LMA 622. The LMA 622 may allocate a prefix and return it to the access gateway 604 with physical block address (PBA) at 618. The access gateway 604 may send a router advertisement message 620 to the device 602 with the allocated prefix.

A device may adopt a default mobility mechanism and/or default mobility settings and/or negotiate a different mobility mechanism based on a determination that the default mechanism is not optimal. A network or a network slice may support multiple mobility schemes with a mobility scheme designated as the default mechanism. The device may access network functions of the default mobility mechanism without negotiation. The device may determine that the default mobility mechanism and/or the default settings related to the default mobility mechanism is not optimal (e.g., based on the application of the device and/or the mobility information of the device). The device may initiate a negotiation procedure for a different mobility mechanism.

The device may start with the default mobility scheme and determine that the default mobility scheme is no longer optimal when certain conditions change. The device may trigger the device to negotiate with the network for a different mobility scheme when the conditions change. For example, the device may start to access the network or network slice using the default mobility scheme. When the device's mobility characteristics change from a low mobility to a high mobility (e.g., the user getting on a train), the device may trigger a negotiation procedure based on the change of the mobility characteristics (e.g., mobility scheme and/or settings). In one or more embodiments, a device may launch an application of low latency. The device may trigger a negotiation procedure to switch to a different mobility scheme from the default mechanism and/or settings. The change of mobility scheme may prompt the device to re-access/re-attach to the network (e.g., using the procedure 600).

The network may use information to guide the mobility scheme negotiation. The information may include the preferred mobility scheme, subscription file, network policy, and/or the like. The initial messages may not indicate the preferred mobility scheme. The subscription file may indicate and/or preconfigure a mobility scheme(s) suitable for the device. The network may retrieve the information about the suitable mobility scheme(s) from the subscription profile repository. The network may use the information to guide the mobility scheme negotiation.

Figure 7:
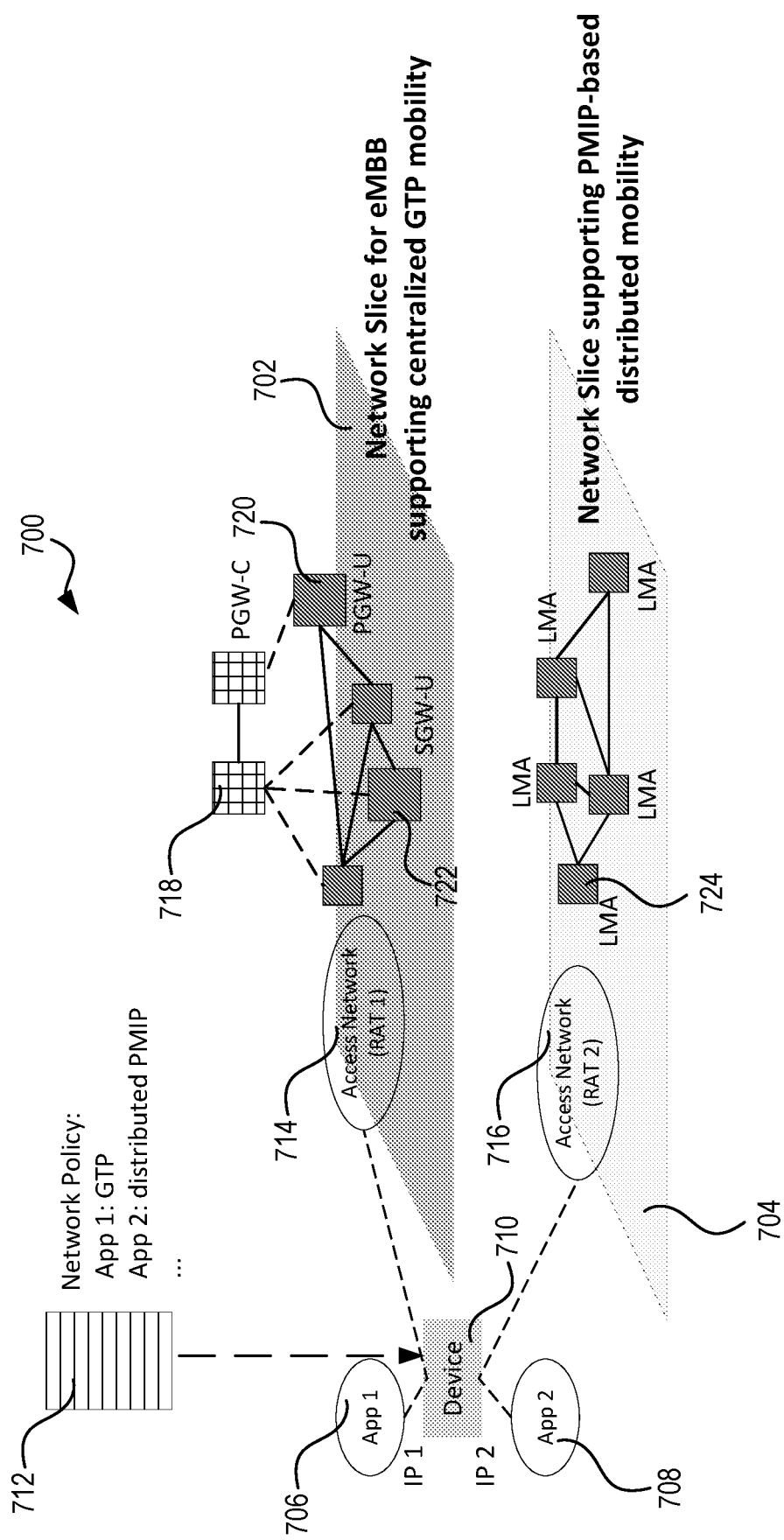
FIG. 7 illustrates an example of selecting two different mobility management mechanisms or network slices for two applications on the same device according to a network provided policy.

A device may trigger a mobility scheme switch based on network policies. The device may receive the network policies from the network. The policies may include one or more of the following: whether a certain mobility scheme may be used or preferred for a certain RAT(s), whether a certain mobility scheme may be used or preferred for a certain area(s), whether a certain mobility scheme may be used or preferred for a certain application/service(s), and/or the like. FIG. 7 illustrates an example of selecting two different mobility management mechanisms or network slices for two applications on the same device according to a network policy.

Multiple applications/services running on the same device may have different mobility scheme preferences. The currently connected network slice may or may not support some or all of them. The device may initiate connection with another network slice that supports the target mobility mechanism for certain applications. The device may be connected with multiple network slices simultaneously.

In FIG. 7, the network slice 702 may support centralized GTP mobility, and the network slice 704 may support PMIP-based distributed mobility. The network slice 702 may include a first mobility mechanism (e.g., supported by 718-722 as described herein) and/or a first mobility scheme. The network slice 704 may include a second mobility mechanism (e.g., supported by 724 as described herein) and/or a second mobility scheme. The network slice 702 and the first mobility mechanism and/or scheme may be accessed through access network 714. The network slice 704 and the second mobility mechanism and/or scheme may be accessed through access network 716. The device 710 may be associated with application 706 and application 708. The device 710 may receive a network policy 712 that is provided by the network. The network policy may provide that application 706 may be associated with a centralized GTP mobility, and application 708 may be associated with a PMIP-based distributed mobility. The device 710 may select the first and the second mobility management mechanisms or network slices for applications 706 and 708 based on the network policy 712.

The device 710 may choose to re-connect to a network slice different from network slices 702-704 based on a target mobility mechanism that is supported by the different network slice. The network slice 702 and/or the network slice 704 may not support the target mobility mechanism. The target mobility scheme may be determined by the network policy and/or the device. For example, the device may selected a mobility scheme tailored to the device.

The mobility scheme tailored for a device may reflect the mobility characteristics of the device. For example, the mobility scheme tailored for a low mobility device may include distributed mobility management. The selected mobility scheme (e.g., the relation between the mobility scheme and the device's mobility characteristics) may be used to determining mobility parameters, values for the mobility parameters, and/or related settings. For example, the device's location/area update timers may be different for various mobility schemes. If a distributed mobility scheme is used, a longer location update timer may be assigned to the device. The radio measurement configurations may be different for various mobility schemes. If a mobility scheme uses host-based mobility management such as MIP, the radio measurement events may not be reported to the network.

The device may be requested by the higher layers (e.g., the application layers) to use a certain mobility scheme (e.g., a different mobility scheme than the mobility scheme that the device is using).

Upon the request by the higher layers, the device may determine whether to modify the mobility scheme/mobility pattern/mobility template that the device is using, request to use the different mobility scheme as an additional mobility scheme, and/or generate a mobility scheme based on mapping rules that are associated with the different mobility scheme. A device may be associated with a mobility scheme. The higher layers (e.g., the application layers) may provide some or all of the mobility parameters, values for mobility parameters, and/or settings for the mobility scheme. If the device or the higher layer (e.g., NAS layer) and/or the 3GPP stack of the device receives a request for a different or modified mobility scheme, the device may determine whether the mobility scheme that the device is using may be modified. The determination may be based on an evaluation whether the mobility scheme that the device is using may meet the request based on the mobility parameters, values for mobility parameters, and/or settings for the mobility scheme provided by the higher layers.

The device may determine and/or request to use the different or modified mobility scheme as a mobility scheme in addition to the mobility scheme that the device is using if the device may determine that the mobility scheme that the device is using may not be modified. The rules and/or procedures and/or implementations associated with a mobility mechanism may indicate whether more than one mobility scheme may be used at a time. The device may receive rules and/or procedures and/or implementations in broadcast of dedicated (e.g., radio or NAS) signaling. The rules and/or procedures and/or implementations may have been saved in the device's memory (e.g., non-volatile memory). The device may use the information (e.g, rules and/or procedures and/or implementations) provided by the higher layers to map into a mobility scheme that is understood by the network. The WTRU may generate a mobility scheme based on the information (e.g., rules and/or procedures and/or implementations). For example, the WTRU may be configured with the mapping rules that take inputs from higher layers to generate a mobility scheme.

The device may input and/or map inputs of settings/values of the received mobility scheme to a modified mobility scheme if the device may determine that the mobility scheme that the device is using may be modified. The modified mobility scheme may be understood by the application layer. The settings/values may be correspond to mobility parameters in the received mobility scheme. A set of inputs of settings/values may contain one or more parameter and/or settings/values. For example, a set of inputs to the received mobility scheme may be mapped to "no support for session continuity in the network" in the modified mobility template. The WTRU may be configured to determine the mapping.

The WTRU may negotiate with the NW about using the modified mobility template as replacement of or in addition to the mobility scheme that the device is using and/or may receive from the network a grant or allowance of using the modified mobility template as replacement of or in addition to the mobility scheme that the device is using. The WTRU may provide an indication to the higher layers (e.g., the application layers) about the grant or allowance (e.g., a granted or allowed mobility scheme used for mobility management). The granted or allowed mobility scheme may be a format that the higher layers may not understand. The indication to the higher layers may be understood by the higher layers.

The WTRU may update a list or context that maps an application ID or application class to a mobility scheme or a network slice. For example, the WTRU may update a list or context that maps an application ID or application class to the grant or allowed mobility scheme or a network slice associated with the grant or allowed mobility scheme.

The application ID, application class, and/or IP flows may be mapped to a mobility scheme or a network slice (e.g., a network slice ID) based on mobility management policies. The device may contain a set of mobility management policies. The network slice ID may map the identified mobility scheme and/or network slice to a mobility scheme which may contain information about the RAT to use for the identified mobility scheme or network slice. The IP flows may include a source, a destination port, and/or IP addresses, and/or other Internet routing and security parameters. The WTRU may determine which data goes on which network slice and/or which data goes on which RAT. One or more of the following options may be used to determine which data goes on which network slice and/or which data goes on which RAT.

Various options may be used to determine which data goes on which network slice and/or which data goes on which RAT. In one or more of the options, the data generated by the application layers may be processed/assigned based on a mapping between a network slice ID and/or a RAT associated with the network slice ID. The data generated by the application layers may be processed (e.g., filtered, categorized, etc.) based on network slice ID and/or the mapping of an application ID, application class, and/or IP flows to a mobility scheme or a network slice ID (e.g., as described herein). The RAT associated with the network slice ID may define a packet treatment. A packet treatment may be processed based on the network slice ID and/or follow the packet treatment defined by the RAT (e.g., LTE RAT) associated with the network slice ID. For example, data provided by application ID X or application class Y may have a mapping to network slice Z. Network slice Z may be to be serviced by Evolved Universal Terrestrial Radio Access (E-UTRAN) according to a mobility scheme. Which and how data goes on the LTE bears (e.g., RAT) may be determined based on the network slice ID and following the procedures and rules associated with E-UTRAN.

In one or more of the options, the data generated by the application layers may be processed/assigned based on rules that include and/or specify RAT to use for a network slice ID. The device may have or be configured to include the rules. For example, if a network slice with a network slice is based on LTE technology, the device's (e.g., WTRU's) traffic flow template or packet filters may include an entry to indicate that an RAT is to be based on LTE. The WTRU may update TFT or packet filters for the WTRU to include a RAT component or a slice ID component when the WTRU receives a different or modified mobility scheme from the network.

The network may determine (e.g., unilaterally determine) whether to modify the mobility scheme that the device is using, whether to request/configure the device to use the different mobility scheme as an additional mobility scheme, and/or whether to grant the request from the device to use the different/modified mobility scheme. The network may determine whether the different/modified scheme may be used by the device as a replacement to the mobility scheme that the device is using based on a subscriber profile and/or local policies of the WTRU. The network may determine whether the different/modified scheme may be used by the device as an additional mobility scheme based on the subscriber profile and/or the local policies of the WTRU. The network may provide the modified/different mobility scheme (e.g., an agreed mobility scheme) to the device. The network may indicate whether the different/modified scheme may be used by the device as a replacement to the mobility scheme that the device is using or as an additional mobility scheme. The network may determine whether to grant the request from the device to use the different/modified mobility scheme. The device may send a request to the network (e.g., via NAS or radio or higher layer signaling) to request the use of the different/modified scheme. The WTRU may indicate in the request whether the mobility scheme is desired as an additional scheme or as a replacement to the mobility scheme that the device is using. The network may determine if the different/modified scheme may be granted.

The network may inform the device to refrain from sending a request to modify or create different mobility schemes for a certain period of time. For example, the WTRU may refrain from sending these requests until a timer expires. The timer's value may be set to the value received from the network.

The network may unilaterally initiate the change of the mobility scheme for devices. For example, the network may monitor the mobility state of a device. A device may use a mobility scheme selected for high-speed mobility. If the network determines that the device remains in low-mobility-state, the network may initiate the change of the mobility scheme for the device to the one that suits low-mobility devices. The device may accept the NW initiated change of active mobility scheme. The device may reject the NW initiated change of active mobility scheme.

An active, flexible, and/or fluid mobility scheme, mobility parameters, and/or the settings/values may be maintained by the device or the network. The active, flexible, and/or fluid mobility scheme, mobility parameters, and/or the settings/values may be maintained after the device and the network agree on a mobility scheme after a negotiation.

The device may maintain an active, flexible, and/or fluid mobility scheme(s), mobility parameters, and/or the settings/values (e.g., an active mobility scheme). The active mobility scheme may be associated with (e.g., result from) a selected and/or negotiated mobility scheme with the network. The active mobility scheme may help the device receive mobility treatments on which the device negotiated and/or agreed with the network. Different active mobility schemes may involve (e.g., result in) different device behaviors. For example, the active mobility scheme may be based on MIP, PMIP, and/or the like. If the active mobility scheme is a mobility scheme based on MIP, the device may receive a home agent (HA) address from the network. The device may receive the HA address from the network during the mobility scheme negotiation procedure. The active mobility scheme based on MIP may include and/or receive an IPv6 prefix from an access gateway. When the active mobility scheme based on MIP receives the IPv6 prefix from the access gateway, the device may initiate the MIP binding update procedure with the HA. If the active mobility scheme is a mobility scheme based on PMIP, the device may not initiate the binding update procedure. The access gateway may perform the binding update procedure with the LMA. A device may maintain an active mobility scheme for a network and/or network slice. A device may be configured to connect and/or capable of connecting with multiple networks/network slices. The device configured to connect and/or capable of connecting with multiple networks/network slices may maintain an active mobility scheme for one network or network slice of the multiple networks/network slices.

The network may maintain an active, flexible, and/or fluid mobility scheme(s), mobility parameters, and/or the settings/values (e.g., active mobility scheme). Different mobility mechanisms in the core network may be implemented. If a network or network slice supports multiple/hybrid mobility management mechanisms, it may be assumed that the some or all the network functions or virtual network functions used to support these mechanisms may be well-defined in a blue print of the network or network slice and/or properly instantiated. The network may include certain related network functions/elements such as mobility control functions and/or access gateways. The mobility control functions and/or access gateways may maintain an active mobility scheme. The active mobility scheme may be maintained as part of a device mobility context. The device mobility context may be utilized by the network functions/ elements to decide which next-hop network functions to use for mobility support.

For example, in FIG. 5, the device mobility context may include a mobility parameter indicating whether a centralized mobility or a distributed mobility is used. The mobility control functions and/or access gateways may determine whether the access gateway may perform binding update with a local mobility anchor (LMA) or a centralized mobility anchor depending on the device mobility context. If the active mobility scheme is a mobility scheme based on PMIP, the device may not initiate the binding update procedure. The access gateway may perform the binding update procedure with the LMA. In one or more embodiments, the device mobility context may include information about whether the route optimization may be supported. An establishment of a tunnel between a different access gateway and an original access gateway may depend on whether the route optimization is supported. A device may be originally associated with an access gateway. When the device moves to a different access gateway and the mobility context of the device indicates that the route optimization may not be supported, the different access gateway may establish a tunnel between the different access gateway and the original access gateway. The different access gateway may become a different mobility anchor in distributed mobility management. Sessions originally established through the original access gateway may be forwarded via the inter-mobility-anchor tunnel. The different access gateway may instruct the routing gateway controller (e.g., if the route optimization may be supported) to modify the underlying router's forwarding table. The different access gateway may instruct the routing gateway controller (e.g., if the route optimization may be supported) to route the sessions to the different access gateway. For example, the different access gateway may instruct the routing gateway controller (e.g., if the route optimization may be supported) to route the sessions to the different access gateway without reading the original access gateway.

The core network may use a mobility scheme(s) to facilitate mobility management. Procedures and/or techniques may be used to ensure that the network functions and elements (e.g., the related network functions and elements) may have and/or be able to access an up-to-date active mobility schemes of a device(s). For example, a device may be connected with a serving access gateway or mobility control functions. When the device connects with a different access gateway, the device may indicate the active mobility scheme associated with the device to the different access gateway. The different access gateway may request to retrieve a mobility context from the serving access gateway or the mobility control functions based on the active mobility scheme. The device mobility context may be stored in a central database and/or may be accessible for some or all related network functions/elements. Network virtualization techniques may enable the device mobility context to be accessible from the central database. When mobility scheme and/or values/settings for mobility parameters changes, the central mobility context database may be updated (e.g., by the network). The changes of the mobility scheme and/or values/settings for mobility parameters changes may be based on a negotiation between the device and the network.

A network entity (e.g., a control plane component, entity, and/or the network) may access/obtain mobility schemes via various approaches. The network entity may access/obtain mobility schemes in subscription information. The network entity may receive mobility schemes from a WTRU or through higher layer transportation protocol. The network entity may receive mobility schemes from the application layer. The network entity may determine a suitable mobility scheme for a WTRU. Based on the mobility schemed received, obtained, and/or determined, the network entity may activate functions and/or elements associated with the network entity to meet service requirements of the WTRU. The network entity may be a primary entity that is responsible for processing a registration of WTRUs. The network entity may include the MME in an LTE system, or the SGSN in the UMTS system, and/or the like.

The network entity may access/obtain mobility schemes/a mobility pattern/mobility template in subscription information received from a subscriber server. The mobility scheme may be defined in the home subscriber server (HSS) per subscriber. The HSS may provide the mobility scheme to the network entity when the network entity requests the subscriber information. The HSS may provide the mobility scheme to the network entity. The HSS may provide the mobility scheme to the network entity when subscriber information changes. The HSS may provide the mobility scheme to the network entity when and the WTRU has been registered in a network and the subscription information changes. For example, during registration of a WTRU, a network entity (e.g., an MME in an LTE system) may request the subscriber information associated with the WTRU from the HSS. The HSS may provide the mobility scheme as part of a response to the request. The WTRU may have been registered in a public land mobile network (PLMN) and/or with a network entity (e.g., an MME). For example, if a WTRU has been registered in a PLMN and/or with an MME, the HSS may perform an update to subscription information. When the subscription information is updated (e.g., a mobility scheme is updated), the HSS may provide the updated subscription information (e.g., the mobility scheme) to the MME.

The network entity may receive mobility schemes from a WTRU or through higher layer transportation protocol. The mobility schemes may become available in the WTRU via configurations. The mobility schemes may become available via one or more of the following higher layer transport protocol approaches: open mobile alliance device management (OMA DM), short message service (SMS), IP, and/or the like. The WTRU may have the information about the mobility scheme in the universal subscriber identity module (USIM). The WTRU may have the information about the mobility scheme stored in non-volatile memory. The WTRU may provide the information about the mobility scheme to the network entity in one or more of the following ways. The WTRU may provide the information about the mobility scheme in an NAS message. The WTRU may provide the information about the mobility scheme in a radio message that is sent to the RAN node. For example, the radio message may be radio resource control (RRC). The RAN node may be eNB.

The network entity may receive mobility schemes from the application layer. The application layer may provide the information about the mobility scheme to the network entity (e.g., via the SCEF). The application layer may provide the information about the mobility scheme to the network entity via APIs (e.g., updated APIs). The APIs may be defined such that a service may be exposed to the application servers or developers. The SCEF or the APIs may deliver the information about the mobility scheme to an entity that handles the WTRU registration. Example of the entity may include the MME or SGSN or a node that performs similar actions. MME may be used as an example to signify a node in a system (e.g., the MME, SGSN, MSC, etc.). The system may be responsible for handling the WTRU registration or handling a sub-set of MME functions. When the network entity (e.g., MME function) receives the information about the mobility scheme, the network entity may perform one or more actions based on the received the information about the mobility scheme. For example, the network entity may update a WTRU context to incorporate (e.g., reflect) the information about the mobility scheme.

A network entity (e.g., MME) may perform one or more actions based on the information about the mobility scheme. The network entity may use the information about the mobility scheme to select a node (e.g., a RAN node or else) and/or a CN for a WTRU. The network entity may use the information about the mobility scheme to determine an IP address for the WTRU. The network entity may allocate a source path to be shared by multiple WTRUs.

The network entity may identify location information from the information about the mobility scheme, and map the location information to a set of RAN nodes. The network entity (e.g., MME) may map the location information to a set of RAN nodes that are near (e.g., within the location). The MME may perform the mapping through various approaches. The location information may comprise coordinates, GPS, address, and/or the like. The network entity (e.g., MME) may identify the set of RAN nodes that are within the location. The network entity (e.g., MME) may derive an identity of at least one RAN node of the set of RAN nodes that provide coverage within the location (e.g., or an area surrounding the location). The RAN node may include WiFi capabilities and/or be configured to include WiFi capabilities. For example, If mobility is supported or indicated as a supported feature, the network entity (e.g., MME) may save in the WTRU context that mobility is supported (e.g., within the set of RAN nodes).

The network entity may determine a dedicated CN for the WTRU based on the information about the mobility schemes. For example, a WTRU may have been serviced by a network entity that services devices with mobility. If the mobility scheme indicates no mobility, the network entity (e.g., MME) may use the indication to determine that the WTRU may be redirected to another network entity (e.g., MME) that services stationary devices. The network entity (e.g., MME) may have location information that allows the network entity to map information about the mobility scheme to the dedicated CN. The redirection of the WTRU to the dedicate CN may be based on the location information. The network entity (e.g., MME) may trigger the redirection using approaches (e.g., solutions) that have been used for and/or by a dedicated CN.

The network entity (e.g., MME) may use the information about the mobility schemes to select one or more of the following nodes in the system: a SGW control plane (CP) node, a PGW CP node, a SGW or PGW node, a set of RAN resources, and/or the like. The network entity (e.g., MME) may forward the information about the mobility schemes to the selected nodes. The selected nodes may use the information about the mobility schemes to determine service aspects that may accommodate service requirements of the WTRU. For example, if the information about the mobility schemes indicates that session continuity is supported by the application layer in the WTRU, the network node (e.g., MME, PGW/SGW, or PGW/SGW-CP) may select a local PGW (LGW) for the device (e.g., WTRU). The WTRU may be allocated an IP address that may associate the LGW with the WTRU. The LGW may be connected with various RAN nodes. The assignment of the LGW for the WTRU may allow session continuity when the WTRU moves within the RAN nodes that are connected with the LGW. The WTRU may be given a different IP address when it leaves the LGW. The application layer may use the session continuity support associated with the application layer when an IP address changes (e.g., due to mobility out of the LGW area).

The network entity (e.g., MME), or nodes that may have received the information about the mobility schemes from the network entity (e.g., the PGW or PGW-CP, or SGW or SGW-CP), may use the information about the mobility schemes to determine a type of IP address to be provided to the WTRU based on the information about the mobility schemes. The network entity or node may act differently based on an indication of the device's mobility in the information about the mobility schemes. If the information about the mobility schemes indicates that the device is stationary, the network node (e.g., MME, PGW/SGW, or PGW/SGW-CP) may allocate a non-globally routable IP address for the device. If the mobility scheme indicates that session continuity is used (e.g., to be supported by the 3GPP system), the network entity and/or node (e.g. MME, PGW/SGW, or PGW/SGW-CP) may allocate a globally routable IP address for the device. The IP address may change. If the information about the mobility schemes indicates that session continuity is supported at the application layer, the network node (e.g. MME, PGW/SGW, or PGW/SGW-CP) may allocate an IP address that is not fixed for this device. The IP address may be a local or non-globally routable IP address.

The information about the mobility schemes may indicate some or all of the WTRUs that are associated with the network entity may be stationary, and/or the network entity may act based on the indication. When the information about the mobility schemes indicates that the WTRU is stationary, the network entity (e.g., MME, eNB, RAN node, PGW/SGW, or PGW/SGW-CP) may allocate and/or use a fixed resource path. The fixed resource path may be shared by some or all the WTRUs associated with mobility scheme that indicate that the WTRUs are stationary. The resource path may be a path between a node (e.g., a RAN node) and CN user plane nodes. For example, the resource path may be the S1 and S5 bearers for an LTE system and/or a similar path. The path may be for a QoS. A set of resources per QoS may be associated with stationary WTRUs. For example, the network entity may use the same fixed resources, per QoS, for some or all the stationary WTRUs that use the QoS. The S1 and S5 bearers may be maintained. Tunnel endpoint identities (TEIDs) that make up bearer connections (e.g., for a QoS) may be shared by the context of some or all of the stationary WTRUs.

The actions performed by the network entity (e.g., as described herein) may be performed when the information about the mobility schemes changes. For example, a change of mobility scheme may direct the WTRU to a different CN where the WTRU's mobility scheme is supported. A change of the mobility scheme (e.g., from not requiring session continuity to be supported 3GPP network to requiring session continuity to be supported 3GPP network) may lead to the allocation of an updated IP address that is globally routable.

The network may have local policies that detail when actions may be executed (e.g., actions as described herein). The actions (e.g., actions as described herein) may be executed at various times. For example, the actions may be executed when the WTRU goes to idle mode, when there is no active data exchange, immediately after the mobility schemes is updated, when the WTRU comes to connected mode due to mobile-originated data or signaling requests, and/or at some other times.

The network entity may act differently based on the mobility of the device (e.g., WTRU). The RAN node may act differently based on the mobility of the device (e.g., WTRU). The mobility of the device may vary from being stationary, being within a geographical area, being high mobility level to being at various other mobility levels.

A network entity (e.g., MME) may perform one or more of the following actions when the information about the mobility scheme indicates a stationary WTRU.

When the information about the mobility scheme indicates a stationary WTRU, the network entity (e.g., MME) may save an identity of a serving RAN node (e.g., the eNB). For example, the network entity (e.g., MME) may save the identity of the serving RAN node as the node where the WTRU is reachable. The identity of the serving RAN node may be used in a paging strategy. The paging strategy may use the RAN node for reaching the WTRU. For example, when the WTRU is paged, the network entity (e.g., MME) may page the WTRU over the RAN node in which the WTRU is expected to be stationary. The MME may page in the cells or eNBs different from the RAN node on which the WTRU may be registered and/or in which the WTRU is expected to be stationary. For example, paging in the different cells or eNBs may be done when a page response is not received after a number of (e.g., N) paging trials over the eNB on which the WTRU may be registered and/or in which the WTRU is expected to be stationary. If the network entity (e.g., MME) pages beyond the RAN node or the eNB on which the WTRU may be registered and/or in which the WTRU is expected to be stationary, the network entity (MME) may page using international mobile subscriber identity (IMSI).

When the information about the mobility scheme indicates a stationary WTRU, the network entity (e.g., MME) may allocate a TEID for a fixed and shared resource path used for stationary WTRUs. The fixed and shared resource path and the TEIDs that identify the fixed and shared resource path may be for a QoS. If the resource path (e.g., the fixed and shared resource path) is established for the QoS, the network entity (e.g., MME) may choose the TEID(s) that identifies the connection per QoS. If the resource path (e.g., the fixed and shared resource path) is established for the QoS, the network entity (e.g., MME) may provide the TEID(s) to the other nodes in the system (e.g., to the SGW and/or the SGW-CP). The network entity (e.g., MME) may provide the TEID(s) as part of a session establishment and/or a context modification for the stationary WTRU.

When the information about the mobility scheme indicates a stationary WTRU, the network entity (e.g., MME) may provide the indication (e.g., via the mobility scheme) of stationary WTRUs to other nodes in the system. For example, the network entity (e.g., MME) may inform the RAN node (e.g., eNB) that the WTRU is stationary. The network entity (e.g., MME) may inform the RAN node that no mobility is used for the WTRU. The indication may be provided via a message or protocol that is used between the CN and the RAN. For example, an S1AP protocol may be used to provide the indication by the network entity (e.g., MME) to the RAN node (e.g., eNB for the LTE system). For the S1AP protocol, the network entity (e.g., MME) may provide the indication in the WTRU context setup request or WTRU context modification request. The network entity (e.g., MME) may provide the indication to CN nodes such as the SGW or the SGW-CP. The nodes may use the indication to select a common resource path that serves a QoS. The shared resource path or bearer may be used to forward data for the WTRU. The SGW or the SGW-CP may forward the indication to the PGW or PGW-CP. The PGW or PGW-CP may take the actions described for the SGW or SGW-CP. For example, the PGW or PGW-CP may take the actions described for the SGW or SGW-CP with respect to the selection of a common bearer or resource path.

When the information about the mobility scheme indicates a stationary WTRU, the network entity (e.g., MME) may inform the RAN node (e.g., eNB) to save the WTRU context when the WTRU goes to an idle mode. The network entity (e.g., MME) may re-use the same context or a sub-set of the context (e.g., security parameters, keys, algorithms, etc.) when the WTRU comes back to a connected mode.

When the information about the mobility scheme indicates a stationary WTRU, the network entity (e.g., MME) may provide the WTRU with a tracking area identity list. For example, the list may comprise one or more tracking area identities. The tracking area identity on the list may be broadcast by an eNB with which the WTRU is connected. The WTRU may be expected to be stationary under the eNB. The tracking area identity on the list may be broadcast by the eNB from which the network received the mobility scheme for the WTRU while the WTRU is connected with the eNB.

When the RAN node (e.g., an eNB hereafter) receives an indication or a mobility scheme indicating that the WTRU is stationary, the eNB may take one or more of the following actions.

When the information about the mobility scheme indicates a stationary WTRU, the eNB may select a fixed resource path or S1 bearer that is set up for some or all stationary WTRUs that use a certain QoS. The eNB may update the WTRU context such that the TEIDs that reflect this shared bearer may be used.

When the information about the mobility scheme indicates a stationary WTRU, the eNB may keep the WTRU's context. For example, the eNB may keep the WTRU's context after the WTRU goes to idle mode. The WTRU's context may include at least the security context of the WTRU. Based on the WTRU's context, the eNB may or may not re-establish security when the WTRU comes back to connected mode. The WTRU's context may include security parameters that are received from the MME. When the WTRU comes to the connected mode, the eNB may run security procedures to establish updated radio security parameters. The same security parameters that are received from the MME may be used.

When the information about the mobility scheme indicates a stationary WTRU, the eNB may configure the WTRU for measurements related to the radio quality of an eNB. For example, the eNB may configure the WTRU for measurements related to the radio quality with the eNB that the WTRU is connecting with. The eNB may not configure the WTRU for measurements related to the radio quality of the eNBs that the WTRU is not connecting with. Other measurements for intra-RAT mobility and inter-RAT mobility may not be configured for the WTRU. The eNB may configure the WTRU with measurements, parameters, and/or rules for offloading to a WiFi access network. The WiFi access network may be in the same area under which the WTRU is expected to be stationary. The WTRU or the eNB may offload to the WiFi access points that are in the same coverage area as the eNB. The eNB may configure the WTRU with the MAC addresses of the WiFi access points that are under the same coverage area as the area where the WTRU is expected to be stationary. The information may be provided by the MME to the WTRU via NAS messages.

A network entity (e.g., MME) may perform one or more of the following actions when the information about the mobility scheme indicates mobility within a geographical area. When the mobility scheme indicates that the WTRU supports mobility within a geographical area, the network may map the geographical area (e.g., areas identified by coordinates, or GPS, or address, etc.) to a set of RAN nodes that provide coverage in that area. A RAN node of the set of the RAN nodes may support a different RAT. The network entity (e.g., MME) may determine the set of the RAN nodes that provide coverage based on the location (e.g., geographical information or mapping). The network entity (e.g., MME) may provide information about the set of RAN nodes (e.g., the set of RAN nodes) to the eNB.

The network entity (e.g., MME) may inform the eNB about the mobility scheme information. The eNB may determine the set of eNBs that are associated with the geographical location. The mobility scheme information may be for a given location area. The mobility scheme information may contain information about RATs that are supported by the WTRU for mobility within that area. When the determination of the eNBs that correspond to the given area is made, or made available to the eNB, the eNB may update the WTRU context such that mobility (e.g., an execution of the mobility) may be allowed to an eNB in the identified list. Mobility (e.g., an execution of the mobility) may not be allowed to an eNB that is not in the identified list. For example, the eNB may configure the WTRU to perform measurements on an eNB in the identified list. The eNB may configure the WTRU not to perform measurements on an eNB that is not in the identified list. Mobility may be executed if the target eNB or target RAN node for the allowed RAT is part of the identified list of nodes on which mobility may be performed. It may be determined not to perform mobility if the target eNB or target RAN node for the allowed RAT is not part of the identified list of nodes on which mobility may be performed.

The WTRU may perform cell reselection if the WTRU is to use an eNB that is not in the identified list. The MME or the eNB may provide the WTRU with the list of eNB identities on which mobility is allowed. The WTRU may use the list to identify the eNBs that are not in the identified list. The WTRU may perform reselection and registration to the network on the identified eNBs if the WTRU reselects to the eNBs that are not in the identified list.

The radio level context may be made available to some or all the eNBs in the location within which mobility is allowed or supported (e.g., an allowed area). The radio level context may include the RAN security context, some or all the RAN context for the WTRU, and/or a sub-set of the context. For example, the RAN security parameters or context may be provided to some or all the eNBs in the allowed area. The network entity (e.g., MME) may inform the serving eNB in the S1AP message to provide the RAN security parameters or context. The eNB may use the information about the mobility scheme to determine that the eNB may share the WTRU context with some or all the eNBs that have been identified as eNBs within which or to which mobility may occur (e.g., the eNBs covering the allowed area). To share the WTRU context, the eNB may use a protocol that the eNB may have with the eNBs that are on the identified list (e.g., the X2 interface). The serving eNB may identify the WTRU with which the serving eNB may share the WTRU context using an ID such as S-TMSI, or IMSI, or other identifications at the NAS or radio level. The serving eNB may inform the network entity (e.g., MME) about the context that may be shared in a location or a set of eNBs covering the location (e.g., after deriving the WTRU context). The MME may send a message to the identified eNBs and provide them with the WTRU context that the serving eNB uses. The MME may indicate in the message the serving eNB ID. The MME may identify the WTRU using an identity such as the S-TMSI, or IMSI, or other identifications at the NAS or radio level. The identified eNB that received the message may save the WTRU context information for the identified WTRU. When a context is saved at the identified eNB, the eNB may serve the WTRU after a handover that enables the identified eNB to serve the WTRU without establishing the WTRU context. For example, a source eNB may choose to handover to a target eNB. A source eNB may provide the QoSs that are being used by the WTRU. The source eNB may provide information including descriptions for resources that the WTRU are using and identity of the resources. The source eNB may or may not provide other information. In one or more embodiments, the network nodes may be aware of the WiFi access points that are available for a given area. The network may provide a list of WiFi access points in the allowed area to the WTRU. The WTRU may use some of the provided WiFi accesses for offloading. The feature described herein with respect to WiFi access technology may apply when a mobility scheme and/or a mobility template associated with the mobility scheme indicates a restricted mobility area (e.g., non-allowed or forbidden area). If a mobility scheme and/or a mobility template associated with the mobility scheme indicates that an area is an allowed area, the network entity (e.g., MME) may configure the WTRU with a list of tracking area identity (TAI) that reflects the tracking area identities. The tracking area identities may be broadcast by the eNBs in the identified location (e.g., allowed area).

A network entity (e.g., MME) may perform one or more of the following actions when the information about the mobility scheme indicates a high mobility level. When the information about the mobility scheme indicates a high mobility level, the MME may take one or more of the following actions and/or some or all of the actions described above. The MME may inform other network nodes that the mobility level is high. The MME may forward the information about the mobility scheme to the other network nodes. The MME may provide the WTRU with a list of TAI that is sufficient to avoid frequent registrations that the WTRU may do as it moves to different TAIs. The MME may start applying a paging strategy. The paging strategy may differ from what may be used for a stationary WTRU. When the eNB receives an indication about the high mobility level, or as indicated by the received information about mobility scheme, the eNB may configure the WTRU to perform measurements on the allowed or supported RATs (e.g., in the allowed areas).

The network may perform one or more of the following actions when the information about the mobility scheme indicate a change of mobility scheme including a change of mobility template/pattern associated with the mobility scheme. The mobility scheme/MT/MP for a given WTRU may change. When the mobility scheme changes, a different mobility scheme may be provided to the MME using one or more of the following approaches discussed herein. The MME may perform a mobility update procedure. When the MME receives an updated mobility scheme, the MME may take actions described herein depending on the information in the mobility scheme. For example, if the mobility scheme that the WTRU has been using indicates a stationary WTRU, and an updated mobility scheme indicates a high level of mobility, the MME may update the WTRU context and may take the actions described herein for a mobility scheme with a high mobility level. For example, the MME may attempt to provide the WTRU with a different IP address. The MME may indicate to the eNB that the mobility scheme has changed and may provide the eNB with the updated mobility scheme. When the eNB receives an updated mobility scheme, the eNB may take actions described herein based on the updated mobility scheme information. For example, if the mobility scheme changes such that the mobility changes from stationary to high level, the eNB may start configuring the WTRU for measurements to support at intra-RAT and/or inter-RAT mobility. The eNB may release the WTRU context when the WTRU goes to idle mode. The eNB may save the WTRU context for the stationary WTRU. The eNB may change the resource path used for this eNB such that the data may traverse through the different path that is not shared for stationary WTRUs. The MME may inform other network nodes (e.g., SGW, or SGW-CP) about the change. The other network nodes may use a different resource path that is not the fixed resource path that may be used for stationary WTRUs. Some or all the network nodes may update the resource paths for the WTRU and the WTRU context accordingly to reflect this update. If the mobility changes from mobility within a given location to a high level mobility, the eNB may send an indication to the rest of the eNBs that may be determined to be part of the previously allowed area such that the WTRU context may be released by the eNBs. The MME may inform some or all the eNBs in the previous allowed area to drop the WTRU context that may have been previously saved.

The LTE system and the LTE system nodes/terminology may be used herein for descriptive purposes. The technological features described herein may apply to an existing system or new system that may emerge. The technological features described herein apply to the corresponding nodes that may perform similar actions in an existing system or new system that may emerge. For example, MME may include an MME, an SGSN or a new control node or virtualized function in a new system that may take on a (e.g., any) sub-set of the MME functions. The concept of bearers (e.g., radio, S1, or S5) may be used as an example. The technological features described herein may apply to a connection that plays the same role as that on the S1 or S5 interfaces.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. A device that performs one or more of the approaches techniques herein may be a user equipment, a WTRU, an IoT device, a vehicular device, and/or the like.

What is claimed is:

1. A wireless transmit/receive unit (WTRU) comprising circuitry, including a transmitter, a receiver and a processor, configured to:
receive a plurality of network policies from a network, wherein a first policy of the plurality of network policies maps an application of the WTRU to a network slice and a second policy of the plurality of network policies indicates at least one mobility-related criteria for the application, the at least one mobility-related criteria comprising an indication of whether an Internet Protocol (IP) address can be changed during a session for the application;
determine that a current connection between the WTRU and a data network does not support one or more of (i) the network slice indicated by the first policy or (ii) the at least one mobility-related criteria indicated by the second policy;
send a request to a network node via a wireless interface, wherein the request indicates the at least one mobility-related criteria indicated by the second policy; and
receive, via the wireless interface, a response indicating that the current connection has been modified such that the WTRU can communicate data associated with the application of the WTRU using the network slice indicated by the first policy and in accordance with the at least one mobility-related criteria indicated by the second policy.

2. The WTRU of claim 1, wherein the request sent to the network node indicates the network slice indicated by the first policy.

3. The WTRU of claim 1, wherein at least one of the plurality of network policies comprises a network slice identification that identifies the network slice.

4. The WTRU of claim 1, wherein at least one of the plurality of network policies comprises an application identification that identifies the application.

5. The WTRU of claim 1, wherein at least one of the plurality of network policies comprises a network slice identification (ID) that identifies the network slice and an application ID that identifies the application, and the network slice ID maps to the application ID.

6. The WTRU of claim 1, wherein at least one of the plurality of network policies comprises an IP flow that indicates the IP address.

7. The WTRU of claim 1, wherein the second policy of the plurality of network policies indicates a second mobility-related criteria for the application, the second mobility-related criteria comprising a second indication whether distributed mobility management is supported during the session for the application.

8. The WTRU of claim 1, wherein the indication indicates the IP address is fixed during the session for the application.

9. The WTRU of claim 1, wherein the current connection supports a default mobility-related criteria.

10. The WTRU of claim 1, wherein the circuitry is configured to re-attach to the network node during the modification of the current connection.

11. A method implemented in a wireless transmit/receive unit (WTRU), the method comprising:
receiving a plurality of network policies from a network, wherein a first policy of the plurality of network policies maps an application of the WTRU to a network slice and a second policy of the plurality of network policies indicates at least one mobility-related criteria for the application, the at least one mobility related criteria comprising an indication of whether an Internet Protocol (IP) address can be changed during a session for the application;

determining that a current connection between the WTRU and a data network does not support one or more of the network slice indicated by the first policy or the at least one mobility-related criteria indicated by the second policy;

sending a request to a network node via a wireless interface, wherein the request indicates the at least one mobility-related criteria indicated by the second policy; and receiving, via a wireless interface, a response indicating that the current connection has been modified such that the WTRU can communicate data associated with the application of the WTRU using the network slice indicated by the first policy and in accordance with the at least one mobility-related criteria indicated by the second policy.

12. The method of claim 11, wherein the request sent to the network node indicates the network slice indicated by the first policy.

13. The method of claim 11, wherein at least one of the plurality of network policies comprises a network slice identification that identifies the network slice.

14. The method of claim 11, wherein at least one of the plurality of network policies comprises an application identification that identifies the application.

15. The method of claim 11, wherein at least one of the plurality of network policies comprises a network slice identification (ID) that identifies the network slice and an application ID that identifies the application, and the network slice ID maps to the application ID.

16. The method of claim 11, wherein at least one of the plurality of network policies comprises an IP flow that indicates the IP address.

17. The method of claim 11, wherein the second policy of the plurality of network policies indicates a second mobility-related criteria for the application, the second mobility-related criteria comprising a second indication whether distributed mobility management is supported during the session for the application.

18. The method of claim 11, wherein the indication indicates the IP address is fixed during the session for the application.

19. The method of claim 11, wherein the current connection supports a default mobility-related criteria.

20. The method of claim 11, further comprising re-attaching to the network node during the modification of the current connection.

* * * * *

UNITED STATES PATENT AND TRADEMARK OFFICE
CERTIFICATE OF CORRECTION

PATENT NO. : 10,897,728 B2
APPLICATION NO. : 16/070092
DATED : January 19, 2021
INVENTOR(S) : Guanzhou Wang et al.

It is certified that error appears in the above-identified patent and that said Letters Patent is hereby corrected as shown below:

In the Specification
At Column 4, Line 35, replace "1x" with --1X--
At Column 13, Line 51, replace "be be" with --be--
At Column 21, Line 63, replace "requested" with --requested.--
At Column 33, Line 32, replace "If" with --if--

In the Claims
At Column 41, Line 1, Claim 11, replace "mobility related" with --mobility-related--

Signed and Sealed this
Twentieth Day of September, 2022

Katherine Kelly Vidal
*Director of the United States Patent and Trademark Office*